(12) United States Patent
Homma et al.

(10) Patent No.: US 10,774,259 B2
(45) Date of Patent: Sep. 15, 2020

(54) ENCAPSULATED AGENT, METHOD OF MANUFACTURING ENCAPSULATED AGENT, AND VARIABLE VISCOSITY FLUID

(71) Applicant: ADEKA CORPORATION, Tokyo (JP)

(72) Inventors: Masatoshi Homma, Tokyo (JP); Kazuyuki Noda, Tokyo (JP); Hirokatsu Shinano, Tokyo (JP); Kensaku Akimoto, Tokyo (JP); Daisuke Sawamoto, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 142 days.

(21) Appl. No.: 15/745,968

(22) PCT Filed: Jul. 29, 2016

(86) PCT No.: PCT/JP2016/072383
§ 371 (c)(1),
(2) Date: Jan. 18, 2018

(87) PCT Pub. No.: WO2017/022681
PCT Pub. Date: Feb. 9, 2017

(65) Prior Publication Data
US 2018/0208832 A1    Jul. 26, 2018

(30) Foreign Application Priority Data
Jul. 31, 2015   (JP) .................................. 2015-152588

(51) Int. Cl.
*C09K 8/70* (2006.01)
*B01J 13/22* (2006.01)
(Continued)

(52) U.S. Cl.
CPC ............. *C09K 8/706* (2013.01); *B01J 13/043* (2013.01); *B01J 13/22* (2013.01); *C09K 8/665* (2013.01);
(Continued)

(58) Field of Classification Search
None
See application file for complete search history.

(56) References Cited

U.S. PATENT DOCUMENTS

| 4,741,401 A * | 5/1988 | Walles | C09K 8/685 166/300 |
| 2002/0160920 A1* | 10/2002 | Dawson | C09K 8/685 507/200 |

(Continued)

FOREIGN PATENT DOCUMENTS

WO    1999/061747 A1    12/1999

OTHER PUBLICATIONS

Ihara, Ken, "The Impact of Shale Gas," Analysis, 2010, vol. 44, No. 3, pp. 15-38.
(Continued)

*Primary Examiner* — John J Figueroa
(74) *Attorney, Agent, or Firm* — Oliff PLC

(57) ABSTRACT

An encapsulated agent includes a central part and an outer part that covers a surface of the central part. The central part contains a viscosity-reducing material that reduces viscosity of a fluid to be used in a hydrofracturing technique. The outer part contains a plurality of particulate substances and a holding material that holds the plurality of particulate substances and enables gradual release of the central part in the fluid. The outer part involves distribution of the plurality of particulate substances that allows a content to have one or more local maxima in a direction away from the central part.

14 Claims, 6 Drawing Sheets

(51) Int. Cl.

| | | |
|---|---|---|
| *E21B 43/26* | (2006.01) | |
| *B01J 13/04* | (2006.01) | |
| *C09K 8/66* | (2006.01) | |
| *C09K 8/80* | (2006.01) | |
| *E21B 43/267* | (2006.01) | |

(52) U.S. Cl.
CPC ............... *C09K 8/80* (2013.01); *E21B 43/26* (2013.01); *E21B 43/267* (2013.01); *C09K 2208/26* (2013.01)

(56) References Cited

U.S. PATENT DOCUMENTS

| | | | | |
|---|---|---|---|---|
| 2009/0044945 | A1* | 2/2009 | Willberg | C09K 8/706 166/308.1 |
| 2010/0307744 | A1* | 12/2010 | Cochet | C09K 8/536 166/250.12 |
| 2013/0123151 | A1* | 5/2013 | Crews | C09K 8/03 507/219 |
| 2013/0130943 | A1* | 5/2013 | Crews | C09K 8/12 507/117 |

OTHER PUBLICATIONS

Ihara, Ken, "The History and Impact of Hydraulic Crushing Technology," Analysis, 2011, vol. 45, No. 3, pp. 17-30.

Sep. 6, 2016 International Search Report issued in International Patent Application No. PCT/JP2016/072383.

\* cited by examiner

[ FIG. 1 ]
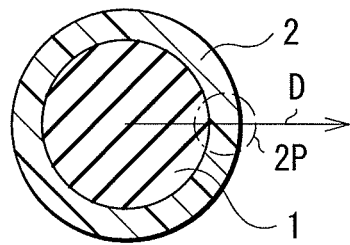
[ FIG. 2 ]
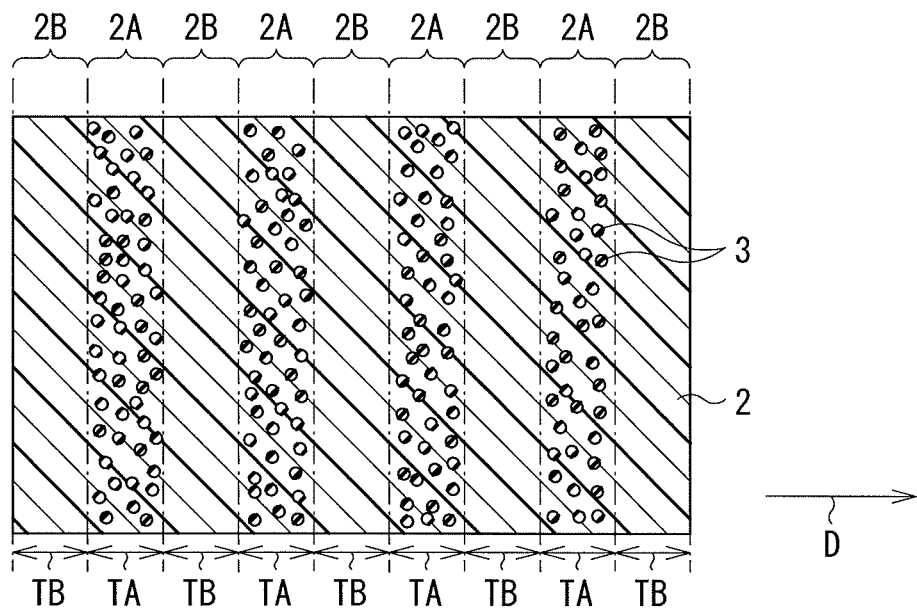
[ FIG. 3 ]
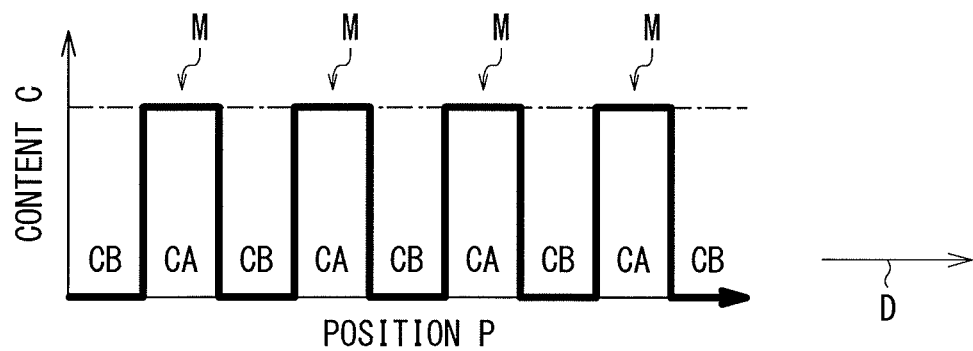

[ FIG. 4 ]
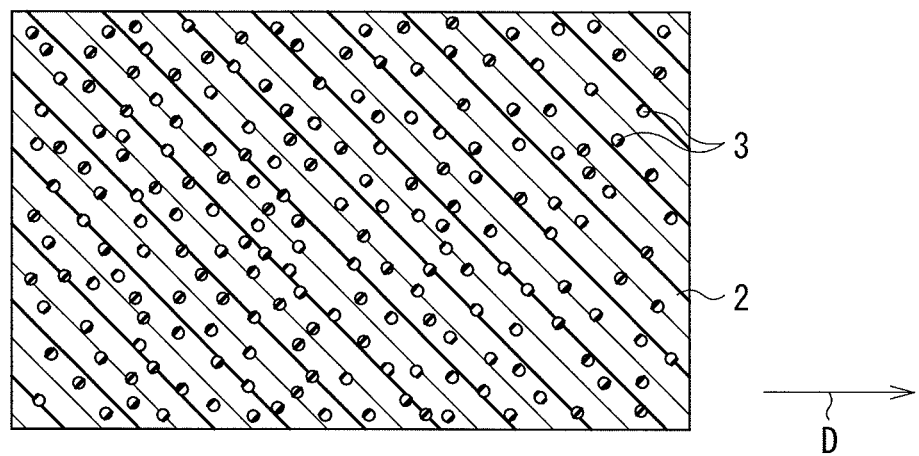
[ FIG. 5 ]
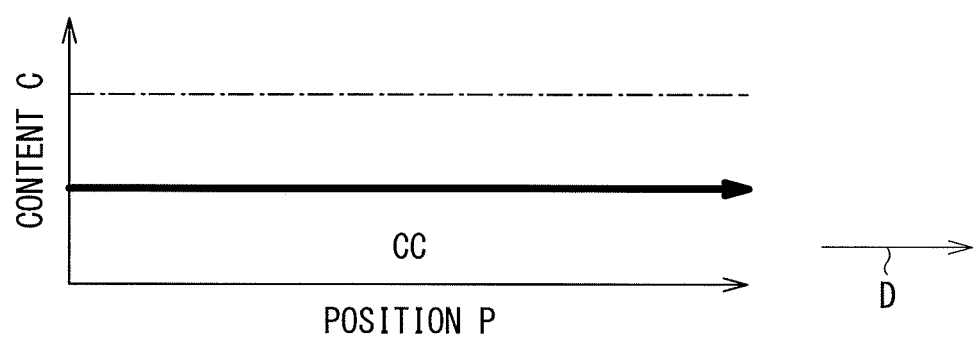

[ FIG. 6 ]
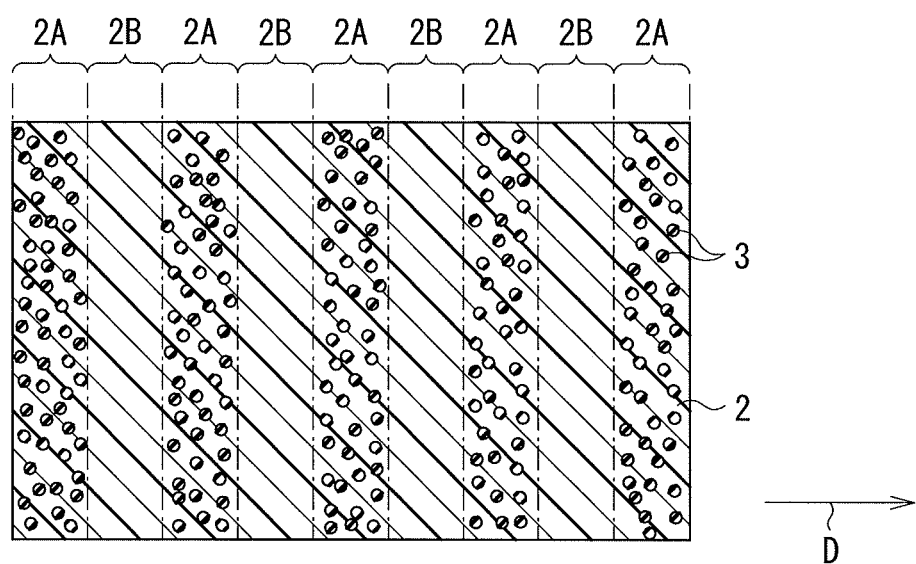
[ FIG. 7 ]
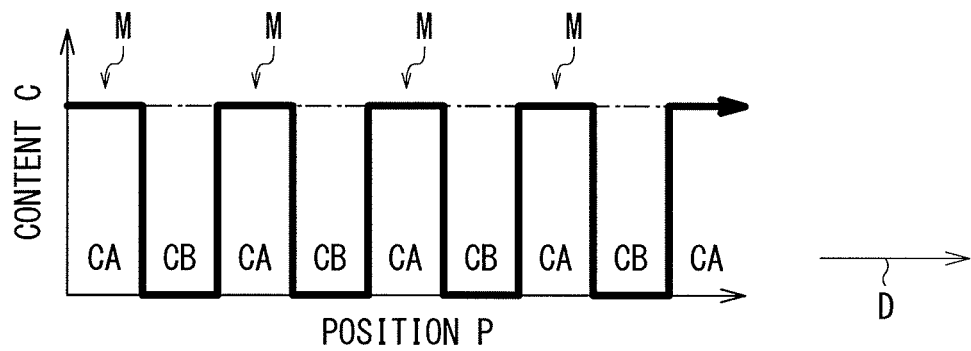

[ FIG. 8 ]
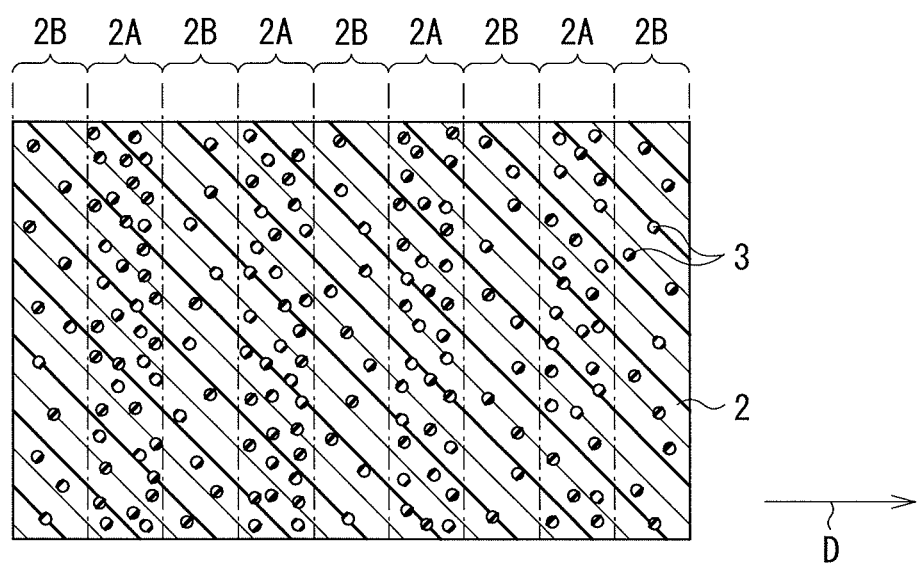
[ FIG. 9 ]
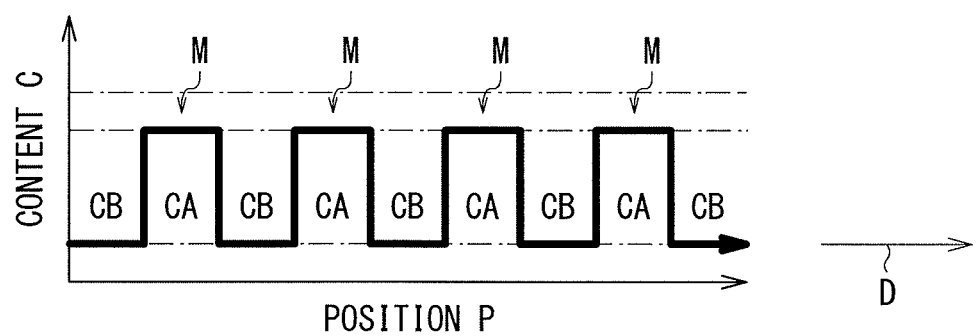

[ FIG. 10 ]
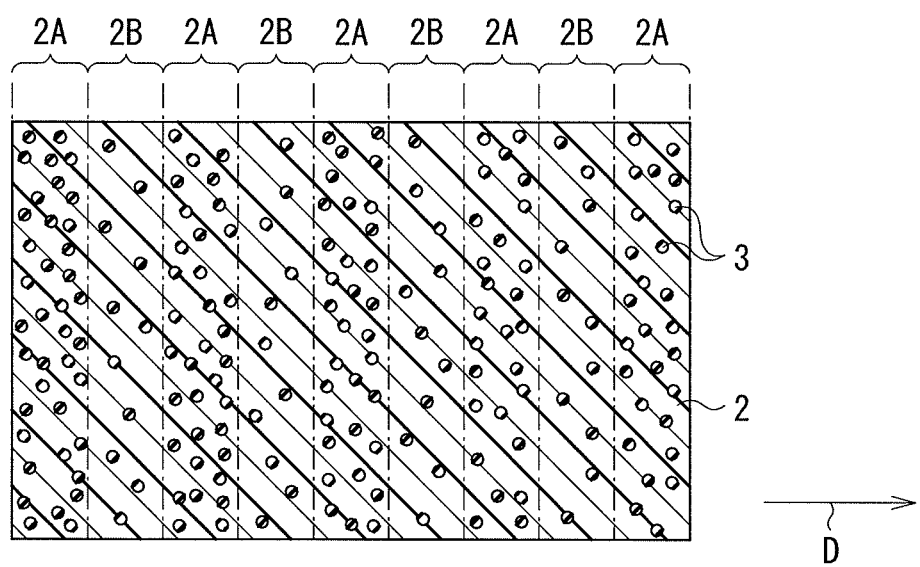
[ FIG. 11 ]
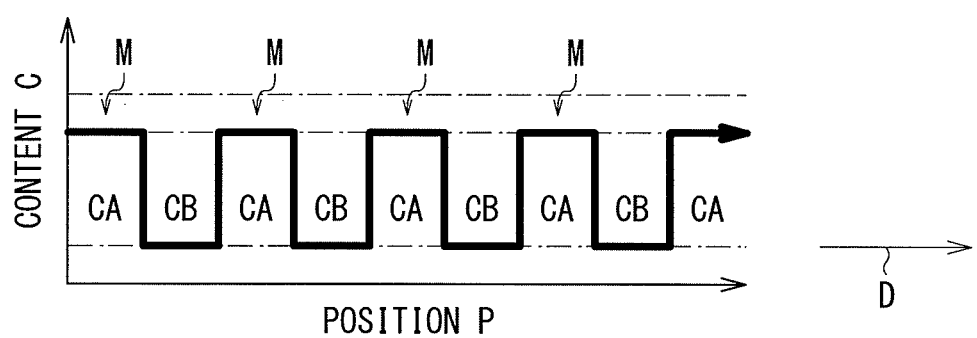

[ FIG. 12 ]
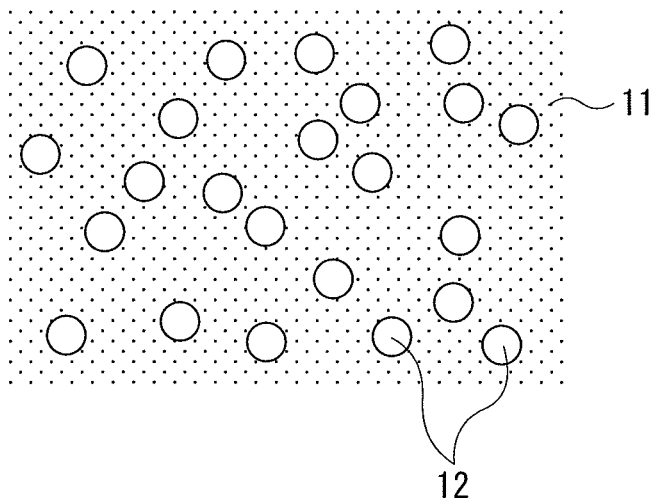
[ FIG. 13 ]
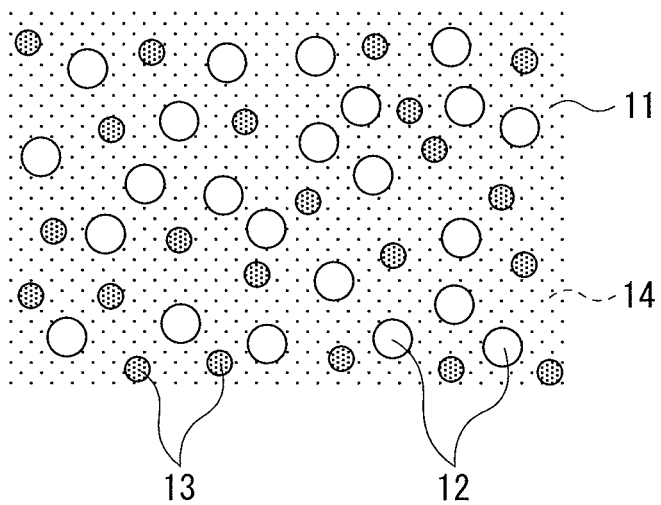

ENCAPSULATED AGENT, METHOD OF MANUFACTURING ENCAPSULATED AGENT, AND VARIABLE VISCOSITY FLUID

TECHNICAL FIELD

The invention relates to an encapsulated agent that reduces viscosity of a fluid, a method of manufacturing such an encapsulated agent, and a variable viscosity fluid that uses the encapsulated agent.

BACKGROUND ART

In association with concerns about supply of energy, shale gas has attracted attention as new energy (for example, see NPTL 1). The shale gas is natural gas contained in a shale stratum. However, the shale gas is so-called unconventional natural gas, which makes it difficult to collect the shale gas from the earth.

Accordingly, as a method of collecting the shale gas from the earth, a hydrofracturing technique has drawn attention (for example, see NPTL 2). The hydrofracturing technique is a method of artificially fracturing a reservoir rock in the vicinity of a well by applying pressure to a fracturing fluid with which the inside of the well is filled. At the time of fracturing of the reservoir rock, cracks (fractures) occur, which allows the shale gas to be collected through the cracks.

The fracturing fluid contains a plurality of particulate substances (proppants) to prevent the cracks from getting blocked after fracturing of the reservoir rock. The plurality of particulate substances are particles of sand, etc.

In the event of occurrence of the cracks, the fracturing fluid applied with pressure comes into the cracks, and accordingly the plurality of particulate substances contained in the fracturing fluid also come into the cracks. As a result, the cracks are retained as they are even if the application of pressure to the fracturing fluid is stopped.

Further, the fracturing fluid contains a viscosity-reducing agent to collect the fracturing fluid after fracturing of the reservoir rock.

To ensure that the plurality of particulate substances easily come into the cracks, the viscosity of the fracturing fluid is desirably high prior to fracturing of the reservoir rock. Meanwhile, after the plurality of particulate substances come into the cracks, to facilitate collection of the fracturing fluid with which the inside of the well is filled, the viscosity of the fracturing fluid is desirably low after the fracturing of the reservoir rock. Therefore, the viscosity-reducing agent (a breaker) having a function of reducing the viscosity of the fracturing fluid (a viscosity-reducing function) is in use.

Concerning a configuration of the viscosity-reducing agent, specific proposals have been already made. For example, to exercise the viscosity-reducing function in the middle of the use of the fracturing fluid, a viscosity-reducing agent (an encapsulated agent) having a capsule structure is in use (for example, see PTL 1). In such an encapsulated agent, a material having the viscosity-reducing function is covered with a coating film that is decomposed utilizing a hydrolysis reaction. The coating film includes poly (2-alkyl cyanoacrylate), etc. as a material to be decomposed utilizing the hydrolysis reaction.

CITATION LIST

Non-Patent Literature

NPTL 1: Ken Ihara, "The Impact of the Shale Gas", Analysis, 2010.5, Vol. 44, No. 3, pp. 15-38, Internet URL: http://oilgas-info.jogmec.go.jp/pdf/3/3574/201005#015a.pdf NPTL 2: Ken Ihara, "The History and Impact of the Hydrofracturing Technique", Analysis, 2011.5, Vol. 45, No. 3, pp. 17-30, Internet URL: http://oilgas-info.jogmec.go.jp/pdf/4/4370/201105#017a.pdf

Patent Literature

PTL 1: International Publication No. WO 99/061747

SUMMARY OF THE INVENTION

Use of an encapsulated agent as a viscosity-reducing agent without limiting an application thereof to a hydrofracturing technique is extremely advantageous in controlling viscosity of a fluid. However, in a case where the encapsulated agent is used, it is desired to sufficiently reduce the viscosity of the fluid in a short amount of time at intended timing, and therefore, there is still room for improvement concerning a viscosity-reducing function of the encapsulated agent.

It is therefore desirable to provide an encapsulated agent, a method of manufacturing such an encapsulated agent, and a variable viscosity fluid that enable a superior viscosity-reducing function to be exercised.

As a result of considerations with a concentrated mind to accomplish the above-described objective, the inventors have found that, in an encapsulated agent that includes a central part containing a viscosity-reducing material and an outer part containing a plurality of particulate substances, the above-described concern is solved by controlling distribution of the plurality of particulate substances in the outer part.

The invention is achieved on the basis of the above-described findings. An encapsulated agent according to an embodiment of the invention includes: a central part containing a viscosity-reducing material that reduces viscosity of a fluid to be used in a hydrofracturing technique; and an outer part. The outer part (1) covers a surface of the central part, (2) contains a plurality of particulate substances and a holding material, and (3) involves distribution of the plurality of particulate substances that allows a content to have one or more local maxima in a direction away from the central part. The holding material holds the plurality of particulate substances and enables gradual release of the central part in the fluid.

A variable viscosity fluid according to an embodiment of the invention includes a fluid body and one or more encapsulated agents. The one or more encapsulated agents include a central part and an outer part. The central part contains a viscosity-reducing material that reduces viscosity. The outer part (1) covers a surface of the central part, (2) contains a plurality of first particulate substances and a holding material, and (3) involves distribution of the plurality of first particulate substances that allows a content to have one or more local maxima in a direction away from the central part. The holding material holds the plurality of first particulate substances and enables gradual release of the central part.

A method of manufacturing an encapsulated agent according to an embodiment of the invention includes: preparing a coating solution containing a holding material; and forming an outer part that (1) covers a surface of a central part, (2) contains a plurality of particulate substances and the holding material, and (3) involves distribution of the plurality of particulate substances that allows a content to have one or more local maxima in a direction away from the central part, the central part containing a viscosity-reducing material that reduces viscosity of a fluid to be used in a hydrofracturing technique, the holding material holding the plurality of particulate substances and enabling gradual release of the central part in the fluid, by supplying the plurality of particulate substances to the surface of the central part to thereby repeatedly increase and decrease an amount of the plurality of particulate substances to be supplied to the surface of the central part, while applying the coating solution to the surface of the central part.

Another method of manufacturing an encapsulated agent according to an embodiment of the invention includes: preparing a first coating solution and a second coating solution, the first coating solution containing a holding material and having a concentration of a plurality of particulate substances that is a first concentration, the second coating solution containing the holding material and having a concentration of the plurality of particulate substances that is a second concentration, the second concentration being higher than the first concentration; and forming an outer part that (1) covers a surface of a central part, (2) contains the plurality of particulate substances and the holding material, and (3) involves distribution of the plurality of particulate substances that allows a content to have one or more local maxima in a direction away from the central part, the central part containing a viscosity-reducing material that reduces viscosity of a fluid to be used in a hydrofracturing technique, the holding material holding the plurality of particulate substances and enabling gradual release of the central part in the fluid, by alternately applying, onto the surface of the central part, the first coating solution and the second coating solution one or more times.

A still another method of manufacturing an encapsulated agent according to an embodiment of the invention includes: preparing a coating solution containing a holding material; and forming an outer part that (1) covers a surface of a central part, (2) contains a plurality of particulate substances and the holding material, and (3) involves distribution of the plurality of particulate substances that allows a content to have one or more local maxima in a direction away from the central part, the central part containing a viscosity-reducing material that reduces viscosity of a fluid to be used in a hydrofracturing technique, the holding material holding the plurality of particulate substances and enabling gradual release of the central part in the fluid, by alternately repeating, on the surface of the central part, a process of applying the coating solution and a process of attaching the plurality of particulate substances to the applied coating solution.

Here, the "encapsulated agent" is used in a state of being contained in the fluid (or the variable viscosity fluid). Accordingly, the "viscosity-reducing material" that is contained in the central part means a material having a function of reducing the viscosity of the fluid containing the encapsulated agent. Further, the "holding material that enables gradual release of the central part in a fluid" contained in the outer part means a material that is able to gradually release the central part (the viscosity-reducing material) into the fluid utilizing some kind of phenomenon in the fluid. The reason for the gradual release of the central part that is performed by the outer part is to exercise the above-described function of the viscosity-reducing material by exposing the central part after the elapse of a certain period of time from the start of use of the encapsulated agent, not from a starting time point of use of the encapsulated agent. It is to be noted that the kind of phenomenon to be utilized for the gradual release of the central part that is performed by the outer part is not limited specifically. For example, one or more kinds of phenomena are utilizable including any of thermal expansion, melting, cracking, deformation, cleavage, swelling, dissolution, dispersion into the fluid, etc. that are caused by heat, friction, pressure, contact with the fluid, etc.

Further, a description of "the content of the plurality of particulate substances (or the plurality of first particulate substances) is allowed to have one or more local maxima in a direction away from the central part" represents how the plurality of particulate substances are distributed in the outer part. In other words, when variation in the content of the plurality of particulate substances in the outer part in a direction from the central part toward the outer part is examined (a horizontal axis: a position in a direction from the central part toward the outer part, a vertical axis: a content of the plurality of particulate substances in the outer part), one or more local maxima are found.

According to the encapsulated agent of the embodiment of the invention, the surface of the central part containing the viscosity-reducing material is covered with the outer part containing the plurality of particulate substances, and the plurality of particulate substances are distributed as described above in the outer part. This allows the superior viscosity-reducing function to be exercised.

According to the variable viscosity fluid of the embodiment of the invention, the variable viscosity fluid includes the one or more encapsulated agents. In such an encapsulated agent, the surface of the central part containing the viscosity-reducing material is covered with the outer part containing the plurality of first particulate substances, and the plurality of first particulate substances are distributed as described above in the outer part. This allows the superior viscosity-reducing function to be exercised, which makes it possible to obtain a superior viscosity variation property.

According to the method of manufacturing an encapsulated agent of the embodiment of the invention, the outer part is formed by supplying the plurality of particulate substances to the surface of the central part to thereby repeatedly increase and decrease an amount of the plurality of particulate substances to be supplied to the surface of the central part, while applying the coating solution to the surface of the central part. Alternatively, the outer part is formed by alternately applying, onto the surface of the central part, the first coating solution and the second coating solution one or more times. The first coating solution has the concentration of the plurality of particulate substances that is the first concentration. The second coating solution has the concentration of the plurality of particulate substances that is the second concentration. The second concentration is higher than the first concentration. Alternatively, the outer part is formed by alternately repeating, on the surface of the central part, the process of applying the coating solution and the process of attaching the plurality of particulate substances to the applied coating solution. Hence, it is possible to manufacture the encapsulated agent that exercises the superior viscosity-reducing function described above.

BRIEF DESCRIPTION OF DRAWINGS

FIG. 1 is a cross-sectional view of a configuration of an encapsulated agent according to an embodiment of the invention.

FIG. 2 is an enlarged cross-sectional view of part of an outer part illustrated in FIG. 1.

FIG. 3 is a diagram illustrating distribution of a plurality of particulate substances in the outer part illustrated in FIG. 2.

FIG. 4 is a cross-sectional view of a configuration of an encapsulated agent (an outer part) according to a comparative example.

FIG. 5 is a diagram illustrating distribution of a plurality of particulate substances in the outer part illustrated in FIG. 4.

FIG. 6 is a cross-sectional view of a configuration of an encapsulated agent (an outer part) according to a first modification example.

FIG. 7 is a diagram illustrating distribution of a plurality of particulate substances in the outer part illustrated in FIG. 6.

FIG. 8 is a cross-sectional view of a configuration of an encapsulated agent (an outer part) according to a second modification example.

FIG. 9 is a diagram illustrating distribution of a plurality of particulate substances in the outer part illustrated in FIG. 8.

FIG. 10 is a cross-sectional view of a configuration of an encapsulated agent (an outer part) according to a third modification example.

FIG. 11 is a diagram illustrating distribution of a plurality of particulate substances in the outer part illustrated in FIG. 10.

FIG. 12 is a diagram illustrating a configuration of a variable viscosity fluid according to an embodiment of the invention.

FIG. 13 is a diagram illustrating another configuration of the variable viscosity fluid according to the embodiment of the invention.

MODES FOR CARRYING OUT THE INVENTION

Hereinafter, embodiments of the invention are described in detail. The order of descriptions is as follows. However, the details concerning the invention are not limited to the embodiments described below, and may be modified as appropriate.
1. Encapsulated Agent
   1-1. Configuration
   1-2. Function
   1-3. Manufacturing Method
   1-4. Workings and Effects
   1-5. Modification Examples
2. Application of Encapsulated Agent (Variable Viscosity Fluid)
   2-1. Configuration
   2-2. Function
   2-3. Workings and Effects

1. Encapsulated Agent

A description is provided of an encapsulated agent according to an embodiment of the invention.

The encapsulated agent described here is a viscosity-reducing agent that exercises a viscosity-reducing function in the middle of use of a fluid, that is a function of reducing the viscosity of the fluid, through the use in a state of being contained in the fluid. The encapsulated agent is dispersed in the fluid, for example.

The application of the encapsulated agent is not specifically limited as long as the application necessitates reduction in the viscosity of the fluid in the middle of use thereof for some reason or other. The application of the encapsulated agent is mainly determined by the intended use of the above-described fluid.

Specifically, the encapsulated agent is used in a hydrofracturing technique, for example. A fluid to be used in the hydrofracturing technique is a so-called fracturing fluid.

1-1. Configuration

First, a description is provided of a configuration of the encapsulated agent.

FIG. 1 illustrates a cross-sectional configuration of the encapsulated agent according to an embodiment of the invention. The encapsulated agent includes a central part 1 and an outer part 2. In other words, the encapsulated agent has a structure (a capsule structure) in which a main body (the central part 1) that exercises the viscosity-reducing function substantially is provided inside a hollow structure (the outer part 2).

It is to be noted that a direction D indicated in FIG. 1 denotes a direction away from the central part 1, corresponding to a direction from the central part 1 toward the outer part 2 (or a thickness direction of the outer part 2).

A shape of the encapsulated agent is not specifically limited, and the encapsulated agent takes a spherical shape, a plate-like shape, a massive shape, etc., for example. FIG. 1 illustrates a case where the encapsulated agent takes the spherical shape, for example.

Dimensions of the encapsulated agent are not specifically limited. For example, in a case where the encapsulated agent takes the spherical shape, an average particle size (a volume average particle size) of the encapsulated agent is within the range of about 100 μm to about 2000 μm.

[Central Part]

The central part 1 is a so-called core of the encapsulated agent, and contains one or more kinds of viscosity-reducing materials.

As described above, the "viscosity-reducing material" is a material having the viscosity-reducing function, and more specifically, is a material that is able to exercise a function of reducing the viscosity of a fluid containing the encapsulated agent. At the time of use of the encapsulated agent, as described later, the outer part 2 performs gradual release of the central part 1, and the central part 1 (the viscosity-reducing material) is thereby released into the fluid. As a result, the viscosity-reducing material exercises the viscosity-reducing function.

The principle (technical basis) on which the viscosity-reducing material reduces the viscosity of the fluid is not specifically limited. In other words, the viscosity-reducing material may be a material that chemically reduces the viscosity of the fluid (a chemical viscosity-reducing material), may be a material that non-chemically reduces the viscosity of the fluid (a non-chemical viscosity-reducing material), or may be both of such materials.

"To chemically reduce the viscosity of the fluid" means that the viscosity-reducing material exercises the viscosity-reducing function utilizing some kind of chemical reaction between the viscosity-reducing material and the fluid. The "chemical reaction" includes one or more kinds of a reaction leading to formation of a chemically-new substance, a reaction leading to chemical decomposition of an existing substance, etc.

It is to be noted that a substance that reacts with the chemical viscosity-reducing material is not specifically limited as long as it includes one or more kinds of any components contained in the fluid. The details of the chemical viscosity-reducing material are described later.

Meanwhile, "to non-chemically reduce the viscosity of the fluid" means that the viscosity-reducing material exercises the viscosity-reducing function without utilizing the above-described chemical reaction. Examples of the non-chemical viscosity-reducing material include one or more kinds of a solvent for dilution, etc.

In a case where the fluid is a liquid, and the viscosity-reducing material is the solvent for dilution, the fluid and the solvent are mixed and the fluid is thereby diluted by the solvent. This decreases the concentration of a solid content in the fluid, resulting in reduction in the viscosity of the fluid. In such a case, the viscosity of the fluid is reduced without utilizing the chemical reaction, and therefore the solvent for dilution is an example of the non-chemical viscosity-reducing material.

In particular, the viscosity-reducing material is preferably the chemical viscosity-reducing material. This is because the chemical viscosity-reducing material is significantly more efficient in reducing the viscosity of the fluid in comparison with the non-chemical viscosity-reducing material. This allows the viscosity of the fluid to be sufficiently reduced in a short amount of time.

Accordingly, in a case where the fluid in the form of a liquid contains a viscosity-thickening agent, the viscosity-reducing material is preferably one or more kinds of materials that decompose the viscosity-thickening agent. This is because, in the fluid containing the viscosity-thickening agent, the viscosity of the fluid is increased with use of a function of the viscosity-thickening agent, and therefore the viscosity of the fluid is reduced utilizing the chemical reaction (a decomposition reaction of the viscosity-thickening agent) owing to decomposition of part or all of the viscosity-thickening agent by the viscosity-reducing material.

Here, the chemical viscosity-reducing material is described in detail. A series of the chemical viscosity-reducing materials described here corresponds to the above-described materials that decompose the viscosity-thickening agent.

Specific examples of the chemical viscosity-reducing material include a metal salt, a metal oxide, a non-metal oxide, an inorganic oxide, an inorganic acid, an inorganic acid salt, an organic peroxide, an organic acid, a metal halide, a metal sulfide, an enzyme, an onium salt, etc.

It is to be noted that a kind of metal elements contained as constituent elements in the above-described specific examples (the metal salt, etc.) of the chemical viscosity-reducing material is not specifically limited as long as such metal elements are one or more kinds of any metal elements.

In particular, the metal element is preferably any of an alkali metal element and an alkali-earth metal element. This is because the chemical viscosity-reducing material is available easily and steadily, and it is easy for the available chemical viscosity-reducing material to reduce the viscosity of a fluid.

A kind of the alkali metal element is not specifically limited, and examples thereof include lithium (Li), sodium (Na), potassium (K), rubidium (Rb), cesium (Cs), etc. A kind of the alkali-earth metal element is not specifically limited, and examples thereof include beryllium (Be), magnesium (Mg), calcium (Ca), strontium (Sr), barium (Ba), etc.

Further, a kind of onium ion contained as a constituent element in the above-described specific examples (the onium salt) of the chemical viscosity-reducing material is not specifically limited as long as it includes one or more kinds of any onium ions. Examples of the onium ion include an ammonium ion, a phosphonium ion, a sulfonium ion, etc.

In particular, the onium ion is preferably the ammonium ion. This is because the chemical viscosity-reducing material is available easily and steadily, and it is easy for the available chemical viscosity-reducing material to reduce the viscosity of the fluid.

The metal salt is a salt that contains a metal element as a constituent element. The metal salt may be a reactant (salt) of any acid and any basic metal compound, or may be a reactant (salt) of any base and any acid metal compound.

In particular, as described above, the metal element is preferably any of the alkali metal element and the alkali-earth metal element, and therefore the metal salt is preferably any of an alkali metal salt and an alkali-earth metal salt.

Specific examples of the metal salt include a metal salt peroxide, a metal salt persulfate, a metal salt perborate, a metal salt hypochlorite, a metal salt hypobromite, a metal salt chlorite, a metal salt chlorate, a metal salt perchlorate, a metal salt bromate, a metal salt iodate, a metal salt sulfate, a metal salt percarbonate, a metal salt carbonate, a metal salt acetate, a metal salt acetyl hydroperoxide, a metal hydroxide salt, a metal salt permanganate, a metal salt molybdate, a metal salt thiosulfate, a metal salt sulfite, an ionic transition metal salt, etc.

The metal salt peroxide is, for example, a sodium peroxide, a calcium peroxide, a magnesium peroxide, etc. The metal salt persulfate is, for example, a sodium persulfate, a potassium persulfate, etc. The metal salt perborate is, for example, a sodium perborate, etc. The metal salt hypochlorite is, for example, a sodium hypochlorite, a potassium hypochlorite, etc. The metal salt hypobromite is, for example, a sodium hypobromite, etc. The metal salt chlorite is, for example, a sodium chlorite, a potassium chlorite, etc. The metal salt chlorate is, for example, a sodium chlorate, a potassium chlorate, etc. The metal salt perchlorate is, for example, a sodium perchlorate, a potassium perchlorate, etc. The metal salt bromate is, for example, a sodium bromate, a potassium bromate, etc. The metal salt iodate is, for example, a sodium iodate, a potassium iodate, a magnesium iodate, etc. The metal salt sulfate is, for example, a calcium sulfate, etc. The metal salt percarbonate is, for example, a sodium percarbonate, a potassium percarbonate, etc. The metal salt carbonate is, for example, a sodium bicarbonate, a potassium bicarbonate, etc. The metal salt acetate is, for example, a sodium acetate, a potassium acetate, etc. The metal salt acetyl hydroperoxide is, for example, a sodium acetyl hydroperoxide, potassium acetyl hydroperoxide, etc. The metal hydroxide salt is, for example, a sodium hydroxide, a potassium hydroxide, a calcium hydroxide, etc. The metal salt permanganate is, for example, a sodium permanganate, a potassium permanganate, etc. The metal salt molybdate is, for example, a sodium molybdate, a lithium molybdate, a potassium molybdate, etc. The metal salt thiosulfate is, for example, a sodium thiosulfate and a potassium thiosulfate. The metal salt sulfite is, for example, a sodium sulfite, a potassium sulfite, etc. The ionic transition metal salt is, for example, a first ferric sulfate, a second ferric sulfate, a zirconium salt, etc.

In particular, as described above, the metal salt is preferably any of the alkali metal salt and the alkali-earth metal salt, and therefore any of the sodium persulfate, the potassium persulfate, etc. is preferable.

The metal oxide is an oxide that contains a metal element as a constituent element. In particular, as described above, the metal element is preferably any of the alkali metal element and the alkali-earth metal element, and therefore the metal oxide is preferably any of the alkali metal oxide and the alkali-earth metal oxide, for example. Specific examples of the metal oxide include a calcium oxide, a barium oxide, a titanium oxide, a silicon oxide, an aluminum oxide, etc.

The non-metal oxide is an oxide that contains no metal element as a constituent element, and is, for example, a chlorine dioxide, etc.

The inorganic oxide is an inorganic-type oxide that contains no metal element as a constituent element, and is, for example, a hydrogen peroxide, etc.

The inorganic acid is an inorganic-type acid that contains no metal element as a constituent element, and is, for example, a hydrochloric acid, a sulfuric acid, a phosphoric acid, a boric acid, etc.

The inorganic acid salt is a reactant (salt) of any inorganic acid that contains no metal element as a constituent element and a basic metal compound. Specific examples of the inorganic acid salt include a zeolite, a sodium phosphate, a potassium phosphate, a potassium chloride, a sodium borate, a potassium borate, a sodium hydrogensulfate, a potassium hydrogensulfate, etc.

The organic peroxide is an organic-type peroxide that contains no metal element as a constituent element. Specific examples of the organic peroxide include a carbamide peroxide, a carbamate peroxide, an acetyl hydroperoxide, a perbenzoic acid, etc.

The organic acid is an organic-type acid that contains no metal element as a constituent element. Specific examples of the organic acid include an acetic acid, a propionic acid, a citric acid, a formic acid, a lactic acid, a butyric acid, an ascorbic acid, an erythorbic acid, an oxalic acid, a malic acid, a fumaric acid, a benzoic acid, a hydroquinone, etc.

The metal halide is a halide that contains a metal element as a constituent element. A kind of halogen is not specifically limited; however, examples of the halogen include one or more kinds of fluorine (F), chlorine (Cl), bromine (Br), iodine (I), etc. Specific examples of the metal halide include a sodium fluoride, a potassium fluoride, a calcium fluoride, etc.

The metal sulfide is a sulfide that contains a metal element as a constituent element. Specific examples of the metal sulfide include a zinc sulfide, a molybdenum sulfide, a zirconium sulfide, etc.

The enzyme is a protein molecule in which about 150 to 500 amino acids are bound, and specific examples thereof include proteinases, peptidases, etc.

The onium salt is a salt containing an onium ion as a cation (a positive ion), and more specifically is a reactant (salt) of any acid and any basic onium compound. In particular, as described above, the onium ion is preferably an ammonium ion, and therefore the onium salt is preferably an ammonium salt.

Specific examples of the onium salt include an ammonium persulfate, an ammonium sulfate, an ammonium bicarbonate, an ammonium acetate, an ammonium molybdate, an ammonium fluoride, etc. In particular, as described above, the onium salt is preferably the ammonium salt, and therefore the ammonium persulfate, etc. are preferable.

[Outer Part]

The outer part 2 is a so-called shell of the encapsulated agent, and covers a surface of the central part 1. The outer part 2 may employ a single-layer or multi-layer configuration.

An average thickness of the outer part 2 is not specifically limited; however, is, for example, within the range of about 40 μm to about 100 μm. The average thickness of the outer part 2 has a possibility of influencing, for example, gradual release speed, etc. of the outer part 2 to be described later.

As described above, to provide the central part 1 inside the hollow structure of the outer part 2, the outer part 2 preferably covers all of the surface of the central part 1. In other words, preferably, the central part 1 is not exposed. This is because the central part 1 (the viscosity-reducing material) is released into the fluid after the elapse of a certain period of time (a period of time necessary for gradual release of the central part 1 that is performed by the outer part 2) from the start of use of the encapsulated agent, which makes it possible to intentionally and sufficiently delay the timing when the viscosity-reducing material exercises the viscosity-reducing function substantially. The reason for this is as follows.

It is to be noted that, hereinafter, for simplicity of explanation, a period of time until the elapse of the certain period of time from the start of use of the fluid is referred to as a "former period of use", and a period of time after the elapse of the certain period of time is referred to as a "latter period of use".

The "former period of use" is mainly a period of time in which the viscosity-reducing material has difficulty in exercising the viscosity-reducing function substantially because the central part 1 (the viscosity-reducing material) is covered with the outer part 2, and the central part 1 is not exposed. Meanwhile, the "latter period of use" is mainly a period in which the viscosity-reducing material is able to exercise the viscosity-reducing function substantially because the central part 1 (the viscosity-reducing material) that is covered with the outer part 2 is released into the fluid due to the gradual release of the central part 1 that is performed by the outer part 2.

As described later, in a case where a fluid containing the encapsulated agent is used, it is desirable that the viscosity be not reduced immediately from the start of use of the fluid (the former period of use), but the viscosity of the fluid be reduced for the first time at the time after the elapse of the certain period of time (the latter period of use) from the start of use of the fluid. This is because, for example, in a case where the fluid containing the encapsulated agent is used in the hydrofracturing technique (the fracturing fluid), it is demanded to keep the viscosity of the fluid in an almost initial state during the former period of use, and to reduce the viscosity of the fluid substantially during the latter period of use, as described above. As a result, while using a common (one kind) fluid during each of the former period of use and the latter period of use, it is possible to make use of advantages based on the relatively-high-viscosity property of the fluid during the former period of use, and to make use of advantages based on the relatively-low-viscosity property of the fluid during the latter period of use.

In a case where not all of the surface of the central part 1 is covered with the outer part 2, part of the central part 1 is exposed from the start of use of the fluid. In such a case, the central part 1 (the viscosity-reducing material) has been already released into the fluid from the former period of use, and therefore the viscosity-reducing material exercises the viscosity-reducing function unintentionally during the former period of use. This results in reduction in the viscosity of the fluid from the former period of use, making it difficult to make use of the advantages based on the high-viscosity property of the fluid during the former period of use.

In contrast, in a case where all of the surface of the central part 1 is covered with the outer part 2, the central part 1 is not exposed at the start of use of the fluid. In such a case, the central part 1 (the viscosity-reducing material) is still less likely to be released into the fluid during the former period of use, and therefore the viscosity-reducing material is less likely to exercise the viscosity-reducing function during the former period of use. As a result, the viscosity of the fluid is kept in the almost initial state during the former period of use, making it easy to make use of the advantages based on the high-viscosity property of the fluid during the former period of use.

In addition, the outer part 2 performs the gradual release of the central part 1 depending on a specific condition, and accordingly the central part 1 is released into the fluid. The "specific condition" refers to one or more kinds of conditions including temperature, time, etc. The basis (principle) on which the outer part 2 performs the gradual release of the central part 1 is described later. In this case, because the central part 1 (the viscosity-reducing material) is released into the fluid at the time of the elapse of a period necessary for the gradual release of the central part 1 that is performed by the outer part 2 (the former period of use), the viscosity-reducing material exercises the viscosity-reducing function after the elapse of the period of time necessary for the gradual release of the central part 1 that is performed by the outer part 2 (the latter period of use). This results in substantial reduction in the viscosity of the fluid during the latter period of use, making it easy to make use of the advantages based on the low-viscosity property of the fluid during the latter period of use.

Accordingly, when all of the surface of the central part 1 is covered with the outer part 2, the continuous use of one kind of fluid containing the encapsulated agent makes it possible to utilize two kinds of advantages based on the mutually-conflicting viscosity properties of the fluid during the former period of use and the latter period of use.

FIG. 2 enlarges part (a portion 2P) of the outer part 2 illustrated in FIG. 1. The outer part 2 includes a plurality of particulate substances 3, and a holding material.

The holding material mainly serves in the role of holding the plurality of particulate substances 3. Because the holding material maintains a dispersion state of the plurality of particulate substances 3 in the outer part 2, the distribution of the plurality of particulate substances 3 in the outer part 2 is maintained as described later.

It is to be noted that the holding material has a property that is able to perform the gradual release of the central part 1 in the fluid containing the encapsulated agent. The "holding material that is able to perform the gradual release of the central part 1 in the fluid" means a material that is able to gradually release the central part 1 (the viscosity-reducing material) into the fluid utilizing some kind of phenomenon in the fluid, as mentioned above. The reason for the gradual release of the central part 1 that is performed by the holding material is to exercise the above-described function of the viscosity-reducing material by exposing the central part 1 after the elapse of a certain period of time to some extent from the start of use of the encapsulated agent, not from the time of the start of use of the encapsulated agent.

It is to be noted that the kind of phenomenon to be utilized for the gradual release of the central part 1 by the holding material is not limited specifically. However, for example, it includes one or more kinds of any state variations due to any external sources. "Any external sources" refer to, for example, heat, friction, pressure, contact with a fluid (for example, water, etc.), etc. "Any state variations" refer to thermal expansion, melting, cracking, deformation, cleavage, swelling, dissolution, dispersion into the fluid, etc.

The holding materials include, for example, one or more kinds of materials that are able to perform the gradual release of the central part 1. The material that is able to perform the gradual release of the central part 1 is, for example, a polymer compound. Examples of the polymer compound include polyurethane, polyester, polyacrylate, polyvinyl alcohol, polystyrene, polybutadiene, cellulose, gelatin, isocyanate adduct of polyol, a vinylidene chloride-methyl acrylate copolymer, a styrene-butadiene copolymer, etc. Besides the above, the holding material may be also, for example, wax, dry oil, etc.

The plurality of particulate substances 3 are so-called fillers, and contain one or more kinds of an inorganic material, etc. for example. The reason why the outer part 2 includes the plurality of particulate substances 3 is that aggregation of particles in the course of granulation is suppressed because the granulating effect is improved at the time of manufacturing of the encapsulated agent (formation of the outer part 2). Examples of the inorganic material include a titanium oxide, a silicon oxide, a talc, a mica, a clay, a bentonite, an aluminum oxide, a zeolite, etc. In particular, the silicon oxide, the talc, and the bentonite are preferable, and the talc is more preferable. This is because the particles in the course of granulation are less likely to be aggregated with one another. The plurality of particulate substances 3 are preferably dispersed in the outer part 2, for example.

The shape of the plurality of particulate substances 3 is not specifically limited; however, includes one or more kinds of spherical, plate-like, massive, needle-like, fibrous, indefinite shapes, etc. FIG. 2 illustrates a case where the plurality of particulate substances 3 take the spherical shapes, for example.

The average particle size (the volumetric average particle size) of the plurality of particulate substances 3 is not specifically limited; however, is preferably smaller than a thickness of the outer part 2 in terms of the granulating effect. Specifically, for example, in a case where the average thickness of the outer part 2 is within the range of about 40 μm to about 100 μm, the volumetric average particle size of the plurality of particulate substances 3 is preferably within the range of about 0.1 μm to about 20 μm as a guide.

The content of the plurality of particulate substances 3 in the outer part 2 is not specifically limited; however, is preferably not excessively large. Specifically, the content of the plurality of particulate substances 3 in the outer part 2 is, for example, within the range of about 10 wt % to about 40 wt %, and is preferably within the range of about 15 wt % to about 30 wt %. This is because, when the content of the plurality of particulate substances 3 is excessively large, there is a possibility that the gradual release speed, etc. of the outer part 2 will suffer adverse effect.

[Distribution of Plurality of Particulate Substances in Outer Part]

Here, attention is focused on the distribution of the plurality of particulate substances 3 in the outer part 2. The plurality of particulate substances 3 are distributed in a manner of representing a specific condition to be described below.

FIG. 3 illustrates the distribution of the plurality of particulate substances 3 in the outer part 2 illustrated in FIG. 2, that is, how the plurality of particulate substances 3 are distributed in the outer part 2. In FIG. 3, a horizontal axis denotes a position P in the outer part 2 in a direction D, and a vertical axis denotes a content C of the plurality of particulate substances 3 in the outer part 2. In other words, in the horizontal axis, a leftmost position P corresponds to a position of an interface of the central part 1 and the outer part 2, and a rightmost position P corresponds to a position of an outermost surface of the encapsulated agent (the outer part 2).

As illustrated in FIG. 3, when how the content C of the plurality of particulate substances 3 in the outer part 2 varies in the direction D is examined, one or more local maxima M are found. In other words, the plurality of particulate substances 3 are distributed in such a manner that the content C of the plurality of particulate substances 3 is allowed to have one or more local maxima M in the thickness direction D (the position P).

It is because the outer part 2 includes large-content regions 2A and small-content regions 2B as illustrated in FIG. 2 that the plurality of particulate substances 3 are distributed in a manner of satisfying the above-described condition. The large-content region 2A is a region with the relatively-large content C of the plurality of particulate substances 3, and the small-content region 2B is a region with the relatively-small content C of the plurality of particulate substances 3. The large-content regions 2A and the small-content regions 2B are disposed alternately in the thickness direction D.

In such a manner, the large-content regions 2A and the small-content regions 2B are disposed alternately in the direction D, and the content C of the plurality of particulate substances 3 in the large-content region 2A and the content C of the plurality of particulate substances 3 in the small-content region 2B are different from each other. Therefore, when variation in the content C of the plurality of particulate substances 3 in the direction D is examined, one or more local maxima M are found, as illustrated in FIG. 3.

The number of the large-content regions 2A included in the outer part 2 is not specifically limited as long as it is one or more. In a case where the number of the large-content regions 2A is two or more, the content C (CA) in each of the two or more large-content regions 2A is not limited specifically. In other words, the content CA in each of the two or more large-content regions 2A may be identical to one another, or may be different from one another. As a matter of course, the contents CA in some of the two or more large-content regions 2A may be identical to one another.

Further, a thickness TA of the large-content region 2A, that is, a range in which the single large-content region 2A is present in the thickness direction D is not limited specifically. In a case where the number of the large-content regions 2A is two or more, the thickness TA of each of the two or more large-content regions 2A may be identical to one another, or may be different from one another. As a matter of course, the thicknesses TA of some of the two or more large-content regions 2A may be identical to one another.

The above description concerning the number and the thicknesses TA of the large-content regions 2A with reference to FIGS. 2 and 3 is similarly applicable to the large-content regions 2A illustrated in FIGS. 6 to 11 to be described later.

The number of the small-content regions 2B included in the outer part 2 is not specifically limited as long as it is one or more. In a case where the number of the small-content regions 2B is two or more, the content C (CB) in each of the two or more small-content regions 2B is not limited specifically. In other words, the content CB in each of the two or more small-content regions 2B may be identical to one another, or may be different from one another. As a matter of course, the contents CB in some of the two or more small-content regions 2B may be identical to one another.

Further, a thickness TB of the small-content region 2B, that is, a range in which the single small-content region 2B is present in the thickness direction D is not limited specifically. In a case where the number of the small-content regions 2B is two or more, the thickness TB of each of the two or more small-content regions 2B may be identical to one another, or may be different from one another. As a matter of course, the thicknesses TB of some of the two or more small-content regions 2B may be identical to one another.

The above description concerning the number and the thicknesses T2 of the small-content regions 2B with reference to FIGS. 2 and 3 is similarly applicable to the small-content regions 2B illustrated in FIGS. 6 to 11 to be described later.

FIG. 2 illustrates a case where the number of the large-content regions 2A is four, and the number of the small-content regions 2B is five, for example. In this case, the content CA in each of the four large-content regions 2A is, for example, identical to one another. In conjunction with this, FIG. 3 illustrates a case where the number of the local maxima M is four, for example. The number of the local maxima M is determined depending on the number of the large-content regions 2A.

It is because a particle size (a thickness of the outer part 2) of the encapsulated agent is easily controlled in the course of manufacturing of the encapsulated agent that the plurality of particulate substances 3 are distributed in the outer part 2 in a manner of satisfying the above-described specific condition. As a result, even if the central part 1 (the viscosity-reducing material) is covered with the outer part 2, the viscosity-reducing material easily exercises the viscosity-reducing function with the superior stability and reproducibility. In addition, a period of time during which the viscosity-reducing material exercises the viscosity-reducing function is easily controlled in a manner of achieving such a function in the intended timing. Further details about these advantages to be obtained are described later.

Here, a value of the content CA of the plurality of particulate substances 3 in the large-content region 2A and a value of the content CB of the plurality of particulate substances 3 in the small-content region 2B are not specifically limited as long as a relationship of CA>CB is satisfied.

Specifically, the small-content region 2B may contain the plurality of particulate substances 3, or may not contain the plurality of particulate substances 3. In other words, in a case where the small-content region 2B contains the plurality of particulate substances 3, the value of the content CB is not specifically limited as long as the value of the content CB is smaller than that of the content CA. Meanwhile, in a case where the small-content region 2B does not contain the plurality of particulate substances 3, the value of the content CB becomes 0.

In particular, the small-content region 2B preferably does not contain the plurality of particulate substances 3. This is because the more enhanced effects are achieved since a difference between the contents CA and CB becomes large sufficiently. Each of FIGS. 2 and 3 illustrates a case where each of the four small-content regions 2B does not contain the plurality of particulate substances 3, for example.

As described above, the large-content regions 2A and the small-content regions 2B are disposed alternately in the direction D; however, the disposition order of the large-content regions 2A and the small-content regions 2B is not limited specifically. Therefore, in the outer part 2, the large-content region 2A may be disposed, or the small-content region 2B may be disposed, at a position closest to the central part 1 (the innermost side). Further, in the outer part 2, the large-content region 2A may be disposed, or the small-content region 2B may be disposed, at a position farthest from the central part 1 (the outermost side). Each of FIGS. 2 and 3 illustrates, for example, a case where the small-content region 2B is disposed at the position closest to the central part 1, and the small-content region 2B is disposed at the position farthest from the central part 2.

In particular, the small-content region 2B is preferably disposed at the position closest to the central part 1. This is because the more enhanced effects are achieved since the central part 1 is covered (encapsulated) with the outer part 2 (the holding material) more firmly owing to a larger occupation rate of the holding material (polymer compound) in the small-content region 2B in comparison with the large-content region 2A. In this case, the small-content regions 2B and the large-content regions 2A are disposed in this order from the side close to the central part 1.

Further, the small-content region 2B is preferably disposed at the position farthest from the central part 1. This is because the more enhanced effects are achieved since particles in the course of granulation are less likely to be aggregated in a manufacturing process of the encapsulated agent. In this case, the large-content regions 2B and the small-content regions 2A are disposed in this order from the side far from the central part 1.

With all these considerations, it is more preferable that the small-content region 2B be disposed at the position closest to the central part 1, and the small-content region 2B be disposed at the position farthest from the central part 1, as illustrated in FIGS. 2 and 3.

It is to be noted that, in FIGS. 2 and 3, the adjoining large-content region 2A and small-content region 2B are partitioned using a straight virtual line (a dashed-dotted line) as a borderline to simplify illustrative representation. Accordingly, the content C varies extremely before and after the above-described borderline.

However, a shape of the virtual line used for partitioning the adjoining large-content region 2A and small-content region 2B is not limited specifically. In addition to the above-described straight line, the virtual line may be a curved line, a polygonal line interlinking a plurality of straight lines, or a combination of two or more kinds of these lines, for example.

Further, the content C may vary consecutively in the vicinity of the borderline between the adjoining large-content region 2A and small-content region 2B. In other words, the content C may increase gradually from the small-content region 2B toward the large-content region 2A, and the content C may decrease gradually from the large-content region 2A toward the small-content region 2B.

[Other Materials]

It is to be noted that the outer part 2 may further include one or more kinds of other materials.

The other materials are a variety of additive agents, for example. Such an additive agent is, for example, a film-forming auxiliary agent that stabilizes resin-film formation. Alternatively, the additive agent is an anti-blocking agent having a function of suppressing aggregation of the encapsulated agents with one another (an anti-blocking function).

1-2. Function

The encapsulated agent functions as follows by being used in a state of being included in the fluid.

During the former period of use, the central part 1 (the viscosity-reducing material) is covered with the outer part 2. In such a case, because the viscosity-reducing material is not released into the fluid, the viscosity-reducing material is still unable to exercise the viscosity-reducing function. As a result, the viscosity of the fluid is maintained in an almost initial state (a state at the time of start of use of the fluid).

During the latter period of use, when the outer part 2 performs gradual release of the central part 1, the central part 1 (the viscosity-reducing material) is released into the fluid. As a result, the viscosity-reducing material exercises the viscosity-reducing function, leading to reduction in the viscosity of the fluid.

It is to be noted that a sustained period of time of the former period of use, that is, the period during which the viscosity of the fluid is maintained in the almost initial state is determined, for example, depending on one or more kinds of conditions including duration of use of the fluid, temperature, etc., as described above. This is because these conditions affect the gradual release speed, etc. of the outer part 2 in the fluid.

For example, in a case where the outer part 2 dissolves over time in the fluid, it is difficult for the outer part 2 to dissolve sufficiently when the duration of use of the fluid is short, but it is easy for the outer part 2 to dissolve sufficiently when the duration of use of the fluid is long. Further, for example, in a case where the dissolution property of the outer part 2 varies depending on the temperature of the fluid, for example, it is difficult for the outer part 2 to dissolve sufficiently when the temperature of the fluid is low, but it is easy for the outer part 2 to dissolve sufficiently when the temperature of the fluid becomes high.

1-3. Manufacturing Method

The above-described encapsulated agent is manufactured by the following procedures, for example.

It is to be noted that a configuration of the encapsulated agent (formation materials of a series of the component parts) has been already described in detail, and therefore the relevant descriptions are hereinafter omitted as appropriate. Further, hereinafter, the description is provided of a case where the outer part 2 illustrated in FIGS. 2 and 3 is formed, for example.

First, the central part 1 containing the viscosity-reducing material, a coating solution to be used for formation of the outer part 2, and the plurality of particulate substances 3 are prepared.

In preparing the coating solution, for example, a holding material and a solvent, etc. are mixed, and thereafter the mixture is stirred, for example. Thereby, the holding material is dissolved or dispersed by the solvent, leading to obtaining of the coating solution containing the holding material. The kind of the solvent is not specifically limited; however, the solvent includes one or more kinds of water, alcohol, etc. It is to be noted that the content of the holding material in the coating solution is settable to any content, and the content of the holding material is settable depending on a coating method.

Next, the coating solution is applied onto a surface of the central part 1, and thereafter the coating solution is dried, leading to formation of the outer part 2.

In this case, in the process of applying the coating solution onto the surface of the central part 1, the plurality of particulate substances 3 are supplied in a manner that the amount of the plurality of particulate substances 3 to be supplied onto the surface of the central part 1 is increased and decreased repeatedly. In other words, in supplying the plurality of particulate substances 3, a state of a relative increase in the supply amount and a state of a relative decrease in the supply amount are repeated alternately. As long as the increase and decrease in the supply amount of the plurality of particulate substances 3 are repeated, the supply amount of the plurality of particulate substances 3 at the time of an increase in the supply amount is not specifically limited, and the supply amount of the plurality of particulate substances 3 at the time of a decrease in the supply amount is not specifically limited. In particular, at the time of a decrease in the supply amount, the supply amount of the plurality of particulate substances 3 may be set to be zero, or greater than zero.

Here, for example, the supply amount of the plurality of particulate substances 3 at the time of a decrease in the supply amount is set to be zero to ensure that a value of the content CB becomes zero because the small-content region 2B does not contain the plurality of particulate substances 3, as described above. In other words, in the process of applying the coating solution onto the surface of the central part 1, for example, the plurality of particulate substances 3 are supplied intermittently.

It is possible to set the number of times of supplying the plurality of particulate substances 3 to any number of times depending on the number of the large-content regions 2A included in the outer part 2. In other words, the number of times of supplying the plurality of particulate substances 3 may be only one, or two or more. Further, it is possible to set the timing of supplying the plurality of particulate substances 3 to any timing depending on the disposition order of the large-content regions 2A and the small-content regions 2B in the outer part 2. That is, the plurality of particulate substances 3 may be supplied from the beginning of the process of applying the coating solution, or the plurality of particulate substances 3 may be supplied in mid-course of the process of applying the coating solution.

In such a manner, the outer part 2 that includes the large-content regions 2A and the small-content regions 2B is formed. In other words, in a case where the outer part 2 is formed, the large-content regions 2A are formed in the process in which the plurality of particulate substances 3 are supplied, and the small-content regions 2B are formed in the process in which the plurality of particulate substances 3 are not supplied.

Such a method of forming the outer part 2 is not specifically limited. Specifically, a method of applying the coating solution onto the surface of the central part 1 includes one or more kinds of any of, for example, a coating method, a spray method, etc.

Further, equipment to be used for the formation of the outer part 2 is not limited specifically. Specifically, the equipment includes, for example, one or more kinds of a high-speed mixer, a spray dry, fluidized-bed granulation coating equipment, etc. In particular, the fluidized-bed granulation coating equipment is preferably rolling-motion fluidized-bed coating equipment, swing-motion fluidized-bed coating equipment, Wurster-type fluidized-bed granulation coating equipment, etc. For example, the rolling-motion fluidized-bed granulation coating equipment is equipment that applies two kinds of coating solutions onto the surface of the central part 1 with use of a spray nozzle while fluidizing the central part 1 being coated spirally on a rotating plate in the inside of a cylindrical rolling-motion fluidized-bed. In this case, wind flows from a lower part to an upper part in the inside of the rolling-motion fluidized-bed, and the central part 1 is thereby rolled upward, which gives a longitudinal motion to the central part 1. In addition, the central part 1 is rotated by rotation of the rotating plate, which gives a horizontal motion to the central part 1. Thereby, the central part 1 is fluidized spirally.

It is to be noted that the detailed description on the Wurster-type fluidized-bed granulation coating equipment is as follows, for example. In using the Wurster method, inside a tube located in the middle in the Wurster-type fluidized-bed granulation coating equipment, a carrier gas stream moving upward inside the tube is generated. Therefore, the central part 1 that is put into the tube is carried upward through the carrier gas stream against gravitational force. When the central part 1 being carried upward passes through one or more spray nozzles, the coating solution is sprayed onto the surface of the central part 1 in a parallel flow manner from the spray nozzles. The central part 1 with the coating solution sprayed thereon drops on a bottom along a wall surface inside the tube, and thereafter is collected at the bottom to be carried upward again inside the tube. In such a manner, the coating solution is sprayed onto the surface of the central part 1 once again. By repeating such a spraying process, the coating solution is repeatedly sprayed onto the surface of the central part 1. It is to be noted that, in a case where the coating solution is sprayed onto the surface of the central part 1 from the spray nozzle, the coating solution is sprayed toward the inside of the tube from the bottom, for example. The spray nozzle may be protruding toward the inside of the tube from the bottom, for example. Further, in a case where the plurality of particulate substances 3 are supplied intermittently, the plurality of particulate substances 3 may be put into the tube intermittently, for example.

The following advantages are obtained by utilizing the coating principle of the fluidized-bed granulation coating equipment. Firstly, the surface of the central part 1 is coated evenly, which ensures that the outer part 2 is formed in such a manner that a uniform thickness is achieved. Secondly, the coating amount is adjusted easily and accurately, and therefore a thickness of the outer part 2 is strictly controlled. Thirdly, in accordance with the strict control of the thickness of the outer part 2, dimensions (average particle size, etc.) of the encapsulated agent are also controlled strictly.

Hence, the viscosity-reducing material (the central part 1) is provided inside the hollow structure (the outer part 2), bringing the encapsulated agent to completion.

1-4. Workings and Effects

According to the encapsulated agent of the embodiment of the invention, the surface of the central part 1 containing the viscosity-reducing material is covered with the outer part 2 containing the plurality of particulate substances 3, as illustrated in FIGS. 1 to 3. In the outer part 2, the plurality of particulate substances 3 are distributed in such a manner that the content C is allowed to have one or more local maxima M in the direction D. As a result, for the reason given below, it is possible to exercise the superior viscosity-reducing function.

FIG. 4 illustrates a cross-sectional configuration of an encapsulated agent (the outer part 2) according to a comparative example, and corresponds to FIG. 2. FIG. 5 illustrates the distribution of the plurality of particulate substances 3 in the outer part 2 illustrated in FIG. 4, and corresponds to FIG. 3.

In the encapsulated agent of the comparative example, as illustrated in FIG. 4, the plurality of particulate substances 3 are dispersed almost evenly in the outer part 2, and thus such an encapsulated agent has a configuration similar to that of the encapsulated agent of the embodiment of the invention with the exception that the outer part 2 thereof does not include the large-content region 2A and the small-content region 2B. In this case, since the plurality of particulate substances 3 are distributed almost evenly in the outer part 2, the content C (CC) of the plurality of particulate substances 3 becomes almost constant without depending on the position P, as illustrated in FIG. 5. As a result, even when variation in the content C of the plurality of particulate substances 3 is examined in the direction D, one or more local maxima M are not found. However, it is assumed that the total amount of the plurality of particulate substances 3 contained in the outer part 2 regarding the encapsulated agent of the comparative example (FIGS. 4 and 5) is similar to the total amount of the plurality of particulate substances 3 contained in the outer part 2 regarding the encapsulated agent of the embodiment of the invention (FIGS. 2 and 3).

In the encapsulated agent of the comparative example, the plurality of particulate substances 3 are not distributed in such a manner that the content C of the plurality of particulate substances 3 is allowed to have one or more local maxima M in the direction D. In this case, because it becomes difficult to control a particle size of the encapsulated agent in a manufacturing process of the encapsulated agent, the particle size of the encapsulated agent is increased easily. As a result, the outer part 2 has difficulty in performing the gradual release of the central part 1, and accordingly the central part 1 (the viscosity-reducing material) has difficulty in exercising the viscosity-reducing function fundamentally. Alternatively, even when the central part 1 (the viscosity-reducing material) is able to exercise the viscosity-reducing function, it is difficult to control a period of time during which the viscosity-reducing material exercises the viscosity-reducing function in a manner of achieving such a function in the intended timing. Therefore, the central part 1 (the viscosity-reducing material) has difficulty in exercising the superior viscosity-reducing function.

In contrast, in the encapsulated agent of the embodiment of the invention, the plurality of particulate substances 3 are distributed in such a manner that the content C of the plurality of particulate substances 3 is allowed to have one or more local maxima M in the direction D. In this case, because the particle size of the encapsulated agent is easily controlled in the manufacturing process of the encapsulated agent, it is difficult for the particle size of the encapsulated agent to increase. As a result, the outer part 2 easily performs the gradual release of the central part 1, and accordingly the central part 1 (the viscosity-reducing material) easily exercises the viscosity-reducing function with stability and reproducibility. In addition, a period of time during which the viscosity-reducing material exercises the viscosity-reducing function is easily controlled in a manner of achieving such a function in the intended timing. Therefore, the central part 1 (the viscosity-reducing material) is able to exercise the superior viscosity-reducing function.

In particular, in the encapsulated agent of the embodiment of the invention, in a case where the fluid is used for the hydrofracturing technique, and the fluid contains a viscosity-thickening agent, when the central part 1 includes a material that decomposes the viscosity-thickening agent, the viscosity-thickening agent is decomposed in the middle of use of the fluid, resulting in reduction in the viscosity of the fluid. Consequently, for a reason similar to that in the above-described case where the central part 1 includes the viscosity-reducing material, it is possible to exercise the superior viscosity-reducing function.

When the outer part 2 includes the large-content regions 2A and the small-content regions 2B, and the large-content regions 2A and the small-content regions 2B are disposed alternately in the direction D, it is possible to control the distribution of the plurality of particulate substances 3 in such a manner that the content C of the plurality of particulate substances 3 is allowed to have one or more local maxima M in the direction D.

When the large-content region 2A includes the plurality of particulate substances 3, while the small-content region 2B does not include the plurality of particulate substances 3, a difference between the content CA of the plurality of particulate substances 3 in the large-content region 2A and the content CB of the plurality of particulate substances 3 in the small-content region 2B becomes large sufficiently, which allows the more enhanced effects to be achieved.

In the outer part 2, when the small-content region 2B is disposed at a position closest to the central part 1, the central part 1 is covered (encapsulated) with the outer part 2 (the holding material) more firmly, which allows the more enhanced effects to be achieved. Further, in the outer part 2, when the small-content region 2B is disposed at a position farthest from the central part 1, particles in the course of granulation are less likely to be aggregated with one another in the manufacturing process of the encapsulated agent, which allows the more enhanced effects to be achieved.

When the outer part 2 contains a polymer compound that holds the plurality of particulate substances 3, a dispersion state of the plurality of particulate substances 3 in the outer part 2 is maintained by the polymer compound. This makes it possible to maintain the distribution of the plurality of particulate substances 3 in the outer part 2.

Besides the above, according to the method of manufacturing the encapsulated agent of the embodiment of the invention, the outer part 2 is formed by supplying the plurality of particulate substances 3 in a manner that increasing and decreasing of the amount of the plurality of particulate substances 3 to be supplied onto the surface of the central part 1 are repeated, while applying the coating solution containing the holding material onto the surface of the central part 1. As a result, in the outer part 2, the plurality of particulate substances 3 are distributed in such a manner that the content C is allowed to have one or more local maxima M in the direction D, which makes it possible to manufacture the encapsulated agent that exercises the superior viscosity-reducing function describe above.

In particular, if the plurality of particulate substances 3 are supplied intermittently, the large-content region 2A that includes the plurality of particulate substances 3 and the small-content region 2B that does not include the plurality of particulate substances 3 are formed. Therefore, as described above, a difference between the content CA of the plurality of particulate substances 3 in the large-content region 2A and the content CB of the plurality of particulate substances 3 in the small-content region 2B becomes large sufficiently, which allows the more enhanced effects to be achieved.

1-5. Modification Examples

Regarding the configuration of the encapsulated agent according to the embodiment of the invention, various modification examples are providable.

Specifically, as long as the plurality of particulate substances 3 are distributed in such a manner that the content C of the plurality of particulate substances is allowed to have one or more local maxima M in the outer part 2 (the direction D), the configuration of the outer part 2 is not limited to each of the configurations illustrated in FIGS. 2 and 3, and the outer part 2 may have any other configuration. In such a case, it is also possible to obtain similar effects.

First Modification Example

FIG. 6 illustrates a cross-sectional configuration of an encapsulated agent (the outer part 2) according to a first modification example, and corresponds to FIG. 2. FIG. 7 illustrates the distribution of the plurality of particulate substances 3 in the outer part 2 illustrated in FIG. 6, and corresponds to FIG. 3.

In a case where the small-content region 2B does not include the plurality of particulate substances 3, the large-content regions 2A and the small-content regions 2B may be disposed alternately in this order from the side close to the central part 1 in the outer part 2, as illustrated in FIGS. 6 and 7. In this case, the large-content region 2A is disposed at a position closest to the central part 1. It is to be noted that the large-content region 2A may be disposed, or the small-content region 2B may be disposed at a position farthest from the central part 1. Each of FIGS. 6 and 7 illustrates, for example, a case where the large-content region 2A is disposed at the position farthest from the central part 1.

The configuration of the encapsulated agent of the first modification example other than the above description is similar to the configuration (FIGS. 2 and 3) of the encapsulated agent according to the embodiment of the invention. Further, the encapsulated agent that includes the outer part 2 illustrated in FIGS. 6 and 7 is manufactured by the procedures similar to those of the encapsulated agent illustrated in FIGS. 2 and 3 with the exception that the formation order of the large-content region 2A and the small-content region 2B is different.

Second Modification Example

FIG. 8 illustrates a cross-sectional configuration of an encapsulated agent (the outer part 2) according to a second modification example, and corresponds to FIG. 2. FIG. 9 illustrates the distribution of the plurality of particulate substances 3 in the outer part 2 illustrated in FIG. 8, and corresponds to FIG. 3.

The small-content region 2B may include the plurality of particulate substances 3. However, as described above, the content CB of the plurality of particulate substances 3 in the small-content region 2B is set to be smaller than the content CA of the plurality of particulate substances 3 in the large-content region 2A.

In this case, the small-content regions 2B and the large-content regions 2A may be disposed alternately in this order from the side close to the central part 1 in the outer part 2, as illustrated in FIGS. 8 and 9. In such a case, the small-content region 2B is disposed, at a position closest to the central part 1. It is to be noted that the large-content region 2A may be disposed, or the small-content region 2B may be disposed at a position farthest from the central part 1. Each of FIGS. 8 and 9 illustrates, for example, a case where the small-content region 2B is disposed at the position farthest from the central part.

The configuration of the encapsulated agent of the second modification example other than the above description is similar to the configuration (FIGS. 2 and 3) of the encapsulated agent according to the embodiment of the invention. Further, the encapsulated agent illustrated in FIGS. 8 and 9 is manufactured by the procedures similar to those of the encapsulated agent illustrated in FIGS. 2 and 3 with the exception that the small-content region 2B is formed to include the plurality of particulate substances 3.

Third Modification Example

FIG. 10 illustrates a cross-sectional configuration of an encapsulated agent (the outer part 2) according to a third modification example, and corresponds to FIG. 8. FIG. 11 illustrates the distribution of the plurality of particulate substances 3 in the outer part 2 illustrated in FIG. 10, and corresponds to FIG. 9.

In a case where the small-content region 2B includes the plurality of particulate substances 3, the large-content regions 2A and the small-content regions 2B may be disposed alternately in this order from the side close to the central part 1 in the outer part 2, as illustrated in FIGS. 10 and 11. In this case, the large-content region 2A is disposed at a position closest to the central part 1. It is to be noted that the large-content region 2A may be disposed, or the small-content region 2B may be disposed at a position farthest from the central part 1. Each of FIGS. 10 and 11 illustrates, for example, a case where the large-content region 2A is disposed at the position farthest from the central part 1.

The configuration of the encapsulated agent of the third modification example other than the above description is similar to the configuration (FIGS. 2 and 3) of the encapsulated agent according to the embodiment of the invention. Further, the encapsulated agent illustrated in FIGS. 10 and 11 is manufactured by the procedures similar to those of the encapsulated agent illustrated in FIGS. 8 and 9 with the exception that the formation order of the large-content region 2A and the small-content region 2B is different.

Fourth Modification Example

Here, a configuration of the outer part 2 is not concretely illustrated; however, such a configuration may be any combination of two or more kinds of a series of the configurations of the outer part 2 illustrated in FIGS. 2, 3, and 6 to 11. As an example of the two kinds of combination, in a case where the outer part 2 includes the two or more small-content regions 2B, some of the small-content regions 2B include the plurality of particulate substances 3, but the other small-content regions 2B may not include the plurality of particulate substances 3.

Further, regarding the method of manufacturing the encapsulated agent according to the embodiment of the invention, various modification examples are providable.

Specifically, as long as the outer part 2 is able to be formed in a manner that the outer part 2 includes the large-content region 2A and the small-content region 2B, a method of forming the outer part 2 is allowed to be changed to any method. In such a case, it is also possible to obtain similar effects.

Fifth Modification Example

As illustrated in FIGS. 8 and 10, to ensure that the small-content region 2B includes the plurality of particulate substances 3, the supply amount of the plurality of particulate substances 3 at the time of a decrease in the supply amount may be made larger than zero to make the content CB larger than zero. In this case, the plurality of particulate substances 3 are supplied consecutively in a manner of repeatedly increasing and decreasing the supply amount. It is to be noted that the supply amount of the plurality of particulate substances 3 at the time of a decrease in the supply amount is not specifically limited as long as it is smaller than the supply amount of the plurality of particulate substances 3 at the time of the increase in the supply amount.

The method of manufacturing the encapsulated agent of a fifth modification example other than the above description is similar to the method of manufacturing the encapsulated agent according to the embodiment of the invention.

Sixth Modification Example

To form the outer part 2 that includes the large-content region 2A and the small-content region 2B, two kinds of coating solutions may be used instead of using one kind of coating solution and supplying the plurality of particulate substances 3.

Specifically, in a case where the outer part 2 is formed using two kinds of coating solutions, a first coating solution and a second coating solution are prepared. The first coating solution contains the holding material, and a concentration of the plurality of particulate substances in the first coating solution is a first concentration. The second coating solution contains the holding material, and a concentration of the plurality of particulate substances in the second coating solution is a second concentration that is higher than the foregoing first concentration. The first concentration is not specifically limited as long as it is relatively smaller than the second concentration, and the second concentration is not specifically limited as long as it is relatively higher than the first concentration.

In particular, the first concentration may be zero because the first coating solution does not contain the plurality of particulate substances 3, or may be greater than zero because the first coating solution contains the plurality of particulate substances 3. Specifically, in a case where the content CB is set at zero, as illustrated in FIGS. 2 and 6, a configuration is made in such a manner that the second coating solution contains the plurality of particulate substances 3, while the first coating solution does not contain the plurality of particulate substances 3. In contrast, in a case where the content CB is made greater than zero, as illustrated in FIGS. 8 and 10, a configuration is made in such a manner that each of the first coating solution and the second coating solution contains the plurality of particulate substances 3. As a matter of course, unlike the above-described first coating solution, the second coating solution contains the plurality of particulate substances 3 to make the second concentration higher than the first concentration.

Thereafter, the first coating solution and the second coating solution are alternately applied onto the surface of the central part 1. More specifically, a process of drying the first coating solution after application of the first coating solution, and a process of drying the second coating solution after application of the second coating solution are repeated alternately. The frequency of application of the first coating solution may be only once, or two or more times. Similarly, the frequency of application of the second coating solution may be only once, or two or more times. As a matter of course, as illustrated in FIGS. 2 and 8, in a case where the small-content region 2B is disposed at a position closest to the central part 1, the first coating solution is first applied onto the surface of the central part 1. In contrast, as illustrated in FIGS. 6 and 10, in a case where the large-content region 2A is disposed at a position closest to the central part 1, the second coating solution is first applied onto the surface of the central part 1. As a result, the small-content region 2A is formed in a coating process using the first coating solution, and the large-content region 2B is formed in a coating process using the second coating solution, leading to formation of the outer part 2 that includes the large-content region 2A and the small-content region 2B.

The method of manufacturing the encapsulated agent of a sixth modification example other than the above description is similar to the method of manufacturing the encapsulated agent according to the embodiment of the invention. In particular, as long as it is ensured that the first coating solution does not contain the plurality of particulate substances 3, the large-content region 2A that includes the plurality of particulate substances 3 and the small-content region 2B that does not include the plurality of particulate substances 3 are formed. Therefore, as described above, a difference between the content CA of the plurality of particulate substances 3 in the large-content region 2A and the content CB of the plurality of particulate substances 3 in the small-content region 2B becomes large sufficiently, which allows the more enhanced effects to be achieved.

Seventh Modification Example

To form the outer part 2 that includes the large-content region 2A and the small-content region 2B, a process of applying the coating solution and a process of supplying the plurality of particulate substances 3 may be repeated instead of supplying the plurality of particulate substances 3 while applying the coating solution.

Specifically, using the procedures similar to those in the method of manufacturing the encapsulated agent according to the embodiment of the invention, the coating solution containing the holding material is prepared. Thereafter, on the surface of the central part 1, a process of applying the coating solution and a process of attaching the plurality of particulate substances 3 to the applied coating solution are repeated alternately. More specifically, a process of applying the coating solution and attaching the plurality of particulate substances 3 to the applied coating solution, and thereafter drying the coating solution with the plurality of particulate substances 3 attached is repeated more than once. The frequency of application of the coating solution may be only once, or two or more times. Similarly, the frequency of attachment of the plurality of particulate substances 3 to the coating solution may be only once, or two or more times. It is to be noted that a final process may be the process of applying the coating solution, or may be the process of attaching the plurality of particulate substances 3 to the coating solution.

In such a manner, the plurality of particulate substances 3 are dispersed in part of the applied coating solution, and the plurality of particulate substances 3 are held by the holding material, and thus the small-content regions 2B and the large-content regions 2A are formed alternately, as illustrated in FIG. 2. This results in formation of the outer part 2 that includes the small-content region 2B and the large-content region 2A.

The method of manufacturing the encapsulated agent of a seventh modification example other than the above description is similar to the method of manufacturing the encapsulated agent according to the embodiment of the invention. In this case, the large-content region 2A that includes the plurality of particulate substances 3 and the small-content region 2B that does not include the plurality of particulate substances 3 are formed. Therefore, as described above, a difference between the content CA of the plurality of particulate substances 3 in the large-content region 2A and the content CB of the plurality of particulate substances 3 in the small-content region 2B becomes large sufficiently, which allows the more enhanced effects to be achieved.

2. Application of Encapsulated Agent (Variable Viscosity Fluid)

Next, a description is provided of an application of the above-described encapsulated agent.

As described above, the application of the encapsulated agent is not specifically limited as long as such an application demands reduction in the viscosity of the fluid containing the encapsulated agent in the middle of use of the fluid.

Here, a fluid whose viscosity is reduced by utilizing the encapsulated agent is referred to as a "variable viscosity fluid". The "variable viscosity fluid" is a fluid having viscosity that is able to sufficiently reduce the viscosity in the middle of use thereof to achieve a specific objective. The variable viscosity fluid is manufactured by the foregoing method of manufacturing the encapsulated agent.

To "sufficiently reduce the viscosity" means that the viscosity is sufficiently reduced to the degree that allows the advantages based on the relatively-high viscosity of the fluid (advantages derived from high viscosity) to be utilized during the former period of use (before reduction in the viscosity of the fluid), as well as to the degree that allows the advantages based on the relatively-low viscosity of the fluid (advantages derived from low viscosity) to be utilized during the latter period of use (after reduction in the viscosity of the fluid). As a result, during the course from the former period of use until the latter period of use, this makes it possible to utilize two kinds of advantages based on the mutually-conflicting viscosity properties of the fluid, that is, the advantages derived from high viscosity and the advantages derived from low viscosity while continuously using a common (one kind) fluid.

2-1. Configuration

FIG. 12 illustrates a configuration of the variable viscosity fluid according to an embodiment of the invention. The variable viscosity fluid includes a fluid body 11, and one or more encapsulated agents 12.

[Fluid Body]

The fluid body 11 is a main component of the variable viscosity fluid, and the encapsulated agent 12 and other materials to be described later are dispersed or dissolved in the fluid body 11. An example of the fluid body 11 includes a liquid. This is because the encapsulated agent 12 is easily dispersed in the fluid body 11, and a dispersion state of the encapsulated agent 12 is easily maintained. The liquid contains, for example, one or more kinds of water, an organic solvent, etc. It is to be noted that, for example, in a case where the variable viscosity fluid is used in the hydrofracturing technique (the fracturing fluid), the above-described liquid contains water.

[Encapsulated Agent]

The encapsulated agent 12 has a configuration similar to that of the above-described encapsulated agent according to the embodiment of the invention. In other words, the encapsulated agent 12 includes the central part 1 containing a viscosity-reducing material, and the outer part 2 containing the plurality of particulate substances 3, as illustrated in FIG. 1. The plurality of particulate substances 3 described here are first particulate substances in the variable viscosity fluid according to the embodiment of the invention, and thus they are different in the concept from a plurality of particulate substances 13 (second particulate substances) to be described later.

For example, in a case where the variable viscosity fluid is used in the hydrofracturing technique (the fracturing fluid), the encapsulated agent 12 that serves as the viscosity-reducing agent is called a breaker. It is to be noted that the viscosity-reducing material that exercises the viscosity-reducing function essentially in the encapsulated agent 12 may be called the breaker in some cases.

Preferably, the encapsulated agent 12 is dispersed in the fluid body 11. This is because the viscosity of the variable viscosity fluid is easily reduced evenly. It is to be noted that the content of the encapsulated agent 12 in the fluid body 11 is not limited specifically. It is possible to set the content of the encapsulated agent 12 to any content depending on conditions such as the viscosity of the variable viscosity fluid during the latter period of use, for example.

[Other Materials]

It is to be noted that the variable viscosity fluid may further include one or more kinds of other materials. FIG. 13 illustrates another configuration of the variable viscosity fluid, and corresponds to FIG. 12.

[Plurality of Particulate Substances]

The other materials are, for example, one or more kinds of the plurality of particulate substances 13. The plurality of particulate substances 13 described here are second particulate substances in the variable viscosity fluid according to the embodiment of the invention, and thus they are different in the concept from the plurality of particulate substances 3 (first particulate substances) described above. More specifically, the plurality of particulate substances 3 are held by the holding material in the outer part 2. In contrast, the plurality of particulate substances 13 are not held by the holding material, and are dispersed in the fluid body 11.

The plurality of particulate substances 13 contain, for example, one or more kinds of sand, etc., and the sand, etc. may be covered with one or more kinds of polymer compounds. The kind of the sand is not specifically limited as long as it is a rock fragment, a mineral fragment, etc. The kind of the polymer compound is not specifically limited as long as it is possible to sufficiently cover surfaces of the sand, etc. The number of kinds of the polymer compound may be only one or more.

Preferably, the plurality of particulate substances 13 are dispersed in the fluid body 11. This is because the plurality of particulate substances 13 fulfill their primary roles more easily as compared with a case where the plurality of particulate substances 13 remain in a state of aggregation, sedimentation, etc.

It is to be noted that the content of the plurality of particulate substances 13 in the fluid body 11 is not specifically limited; however, it is determined depending on, for example, a role (a function), an application, a purpose, etc. of the variable viscosity fluid. Further, the role of the plurality of particulate substances 13 is not specifically limited; however, it is determined depending on, for example, the application, the purpose, etc. of the variable viscosity fluid, as with the case of the content described above.

For example, in a case where the variable viscosity fluid is used in the hydrofracturing technique (the fracturing fluid), the plurality of particulate substances 13 serve as the so-called proppants. As described above, the proppant is used to prevent cracks arising in destroying a reservoir from being blocked. In this case, it is preferable that the plurality of particulate substances 13 be dispersed in the fluid body 11, and that such a dispersion state of the plurality of particulate substances 13 be maintained. This is because the transport property of the plurality of particulate substances 13 is improved during use of the variable viscosity fluid. As a result, when the variable viscosity fluid comes into the cracks, the plurality of particulate substances 13 are more likely to come into the cracks along with the fluid body 11. Further, the amount of the plurality of particulate substances 13 that come into each of the cracks is less likely to vary.

It is to be noted that the plurality of particulate substances 13 are not limited to the proppant. In a case where the variable viscosity fluid is used for any application other than the hydrofracturing technique (the fracturing fluid), the plurality of particulate substances 13 may be used for a purpose that is different from the proppant.

[Viscosity-Thickening Agent]

Further, the other materials are, for example, one or more kinds of a viscosity-thickening agent 14. The viscosity-thickening agent 14 serves to increase the viscosity of the variable viscosity fluid during the former period of use, and contains, for example, one or more kinds of a gelling agent, a cross-linking agent, etc. The gelling agent contains, for example, one or more kinds of guar gum, carboxymethyl cellulose, etc. The cross-linking agent contains, for example, one or more kinds of a boric acid, a zirconium complex, etc. In a case where the variable viscosity fluid contains the gelling agent, for example, the variable viscosity fluid is gelated. It is to be noted that the content of the viscosity-thickening agent 14 in the fluid body 11 is not limited specifically. It is possible to set the content of the viscosity-thickening agent 14 to any content depending on conditions such as the viscosity of the variable viscosity fluid during the former period of use, etc., for example. The viscosity-thickening agent may be either dissolved or dispersed in the fluid body 11, or may be both dissolved and dispersed in the fluid body 11.

In a case where the variable viscosity fluid does not contain the viscosity-thickening agent 14, the viscosity of the variable viscosity fluid during the former period of use is determined substantially on the basis of the viscosity of the fluid body 11 itself. In this case, it is preferable that the viscosity of the variable viscosity fluid during the former period of use be sufficiently high to maintain a dispersion state of the encapsulated agent 12, etc. in the fluid body 11. Therefore, in a case where the viscosity of the variable viscosity fluid during the former period of use is not sufficiently high, the viscosity of the variable viscosity fluid during the former period of use is preferably increased with use of the viscosity-thickening agent 14. This is because aggregation, sedimentation, etc. of the encapsulated agent 12, etc. are less likely to occur in the fluid body 11, and thus the dispersion state of the encapsulated agent 12, etc. is more likely to be maintained in the fluid body 11.

[Additive Agent]

Further, the other materials are one or more kinds of a variety of additive agents. Examples of the additive agent include a friction-reducing agent, a surfactant agent, a pH adjuster, a corrosion inhibitor, a biocide, an iron-control agent, etc.

The friction-reducing agent mainly controls the fluidity of the plurality of particulate substances 13 in the variable viscosity fluid. The friction-reducing agent contains, for example, one or more kinds of polyacrylamide, etc.

The surfactant agent mainly controls the dispersibility, fluidity, etc. of the viscosity-reducing material. The surfactant agent contains, for example, one or more kinds of an alcohol-based active agent, etc.

The pH adjuster mainly adjusts pH of the variable viscosity fluid. The pH adjuster contains, for example, one or more kinds of a potassium carbonate, etc.

The corrosion inhibitor mainly prevents corrosion of a device, an instrument, etc. that are brought into contact with the variable viscosity fluid during use of the variable viscosity fluid. The corrosion inhibitor contains, for example, one or more kinds of formaldehyde, isopropyl alcohol, etc. It is to be noted that the device, the instrument, etc. that come in contact with the variable viscosity fluid are, for example, a pipe, etc. to be used for transportation of the variable viscosity fluid.

The biocide mainly suppresses an increase in the amount of microorganisms mixed into the variable viscosity fluid. The biocide contains, for example, one or more kinds of gultaraldehyde, hydrogen peroxide water, etc.

The iron-control agent mainly prevents sedimentation of a metal oxide that is attributable to iron. The iron-control agent contains, for example, one or more kinds of an acetic acid, a citric acid, an ascorbic acid, an ethylene glycol, etc.

2-2. Function

The variable viscosity fluid includes the encapsulated agent 12 having a configuration similar to that of the above-described encapsulated agent according to the embodiment of the invention. Therefore, in the course of use of the variable viscosity fluid, the viscosity of the variable viscosity fluid is reduced utilizing the encapsulated agent 13.

Specifically, during the former period of use, the viscosity-reducing material has still difficulty in exercising the viscosity-reducing function, and thus the viscosity of the variable viscosity fluid is maintained in an initial state. Meanwhile, during the latter period of use, the viscosity-reducing material exercises the viscosity-reducing function, resulting in a reduction in the viscosity of the variable viscosity fluid.

2-3. Workings and Effects

According to the variable viscosity fluid of the embodiment of the invention, the variable viscosity fluid includes the one or more encapsulated agents 12, and the encapsulated agent 12 has a configuration similar to that of the above-described encapsulated agent according to the embodiment of the invention. In this case, as described above, the encapsulated agent 12 exercises the superior viscosity-reducing function in the course of use of the variable viscosity fluid although the one kind of variable viscosity fluid is used, and therefore the viscosity of the variable viscosity fluid is sufficiently reduced in a short time. This allows the superior viscosity variation characteristics to be achieved with the use of the viscosity-reducing function of the encapsulated agent 12.

Because the variable viscosity fluid is particularly used in the hydrofracturing technique (the fracturing fluid), the following effects are obtained in a case where the variable viscosity fluid contains the plurality of particulate substances 13.

Firstly, during the former period of use, the viscosity of the variable viscosity fluid is maintained in the initial state, and thus the dispersion state of the plurality of particulate substances 13 is maintained in the variable viscosity fluid. Therefore, by applying pressure to the variable viscosity fluid, it is possible to make the plurality of particulate substances 13 sufficiently come into the cracks arising in destroying the reservoir utilizing the relatively-high viscosity of the variable viscosity fluid.

Secondly, during the latter period of use, the viscosity of the variable viscosity fluid is sufficiently reduced, resulting in the improved fluidity of the variable viscosity fluid. Therefore, by performing suction, etc. of the variable viscosity fluid, it is possible to collect the used variable viscosity fluid in a short time utilizing the relatively-low viscosity of the variable viscosity fluid.

Thirdly, only the common (one kind of) variable viscosity fluid has to be used to make the plurality of particulate substances 13 sufficiently come into the cracks during the former period of use, and to collect the used variable viscosity fluid in a short time during the latter period of use, as described above. This makes it possible to easily and stably utilize two kinds of advantages based on the mutually-conflicting viscosity properties of the fluid.

Any other workings and effects concerning the variable viscosity fluid are similar to the workings and effects of the encapsulated agent according to the embodiment of the invention.

Working Examples

Hereinafter, a description is provided of working examples of the invention. The order of descriptions is as follows. However, the embodiments of the invention are not limited to the embodiments to be described here.
1. Manufacturing of Encapsulated Agent
2. Evaluation of Encapsulated Agent 1. Manufacturing of Encapsulated Agent Experimental Example 1

First, the encapsulated agent that includes the outer part 2 illustrated in FIGS. 1 to 3 was manufactured by the following procedures.

In the first place, a coating solution was prepared by mixing the holding material (styrene-butadiene latex (SB latex)) and a solvent (mixture of ethanol and water with a weight ratio of 50 to 50), and thereafter stirring the mixture. In this case, the content of the holding material in the coating solution was set at 20 wt %.

Next, the outer part 2 was formed by applying (spraying) the coating solution onto the surface of the central part 1 (a viscosity-reducing material: ammonium persulfate, a volumetric average particle size=430 μm) of 500 grams using the rolling-motion fluidized-bed coating equipment (type LABO available from Freund Corporation), and thereafter drying the applied coating solution. In this case, the formation amount of the outer part 2 was adjusted to ensure that a weight ratio of the central part 1 relative to a total weight became 70%. Further, in a process of the application of the coating solution, the plurality of particulate substances 3 (talc, the volumetric average particle size=4 μm) of 100 grams were intermittently put into the equipment separately five times.

In such a manner, the large-content regions 2A that included the plurality of particulate substances 3 and the small-content regions 2B that did not include the plurality of particulate substances 3 were formed, and therefore the surface of the central part 1 was covered with the outer part 2 that included the above-described large-content regions 2A and small-content regions 2B. In this case, by adjusting the timing of putting the plurality of particulate substances 3 into the equipment, the small-content region 2B was disposed at a position closest to the central part 1, and the small-content region 2B was disposed at a position farthest from the central part 1. Such a procedure brought the encapsulated agent (the volumetric average particle size=660 μm) into completion.

Experimental Example 2

The encapsulated agent (the volumetric average particle size=520 μm) was manufactured by the procedures similar to those of the experimental example 1 with the exception that potassium persulfate (the volumetric average particle size=330 μm) was used instead of ammonium persulfate as the viscosity-reducing material.

Experimental Example 3

For comparison, the procedures similar to those of the experimental example 1 were taken with the exception that the outer part 2 was not formed. In such a manner, a non-encapsulated agent was manufactured using the central part 1 (the viscosity-reducing material: ammonium persulfate, the volumetric average particle size=430 μm) as it was.

Experimental Example 4

For comparison, the encapsulated agent (the volumetric average particle size=990 μm) was manufactured by the procedures similar to those of the experimental example 1 with the exception that the outer part 2 illustrated in FIGS. 4 and 5 was formed. In this case, instead of putting the plurality of particulate substances 3 into the equipment in the process of the application of the coating solution, a coating solution containing the plurality of particulate substances 3 preliminarily was prepared, and thereafter the outer part 2 was formed using such a coating solution. It is to be noted that the amount of application of the coating solution used here, and the content of the plurality of particulate substances 3 in the coating solution were similar to the amount of application of the coating solution used in the experimental example 1, and the amount of the plurality of particulate substances 3 that were put into the equipment in the experimental example 1. It is to be noted that the reason why the volumetric average particle size of the encapsulated agent in the experimental example 4 became greater than the volumetric average particle size of the encapsulated agent in the experimental example 1 although the same amount of coating solution was used in the experimental examples 1 and 4 was that the encapsulated agent having a multi-core structure was manufactured because particles in the course of granulation were aggregated with one another in the process of forming the outer part 2 in the experimental example 4. Since the encapsulated agent having the multi-core structure was substantially formed of a plurality of encapsulated agents, it included the plurality of central parts 1 (viscosity-reducing materials).

2. Evaluation of Encapsulated Agent

As a result of examination of the performance of the above-described encapsulated agent, etc., a result indicated in Table 1 was obtained. Here, to evaluate the viscosity-reducing function (the viscosity-reducing effect) of the encapsulated agent, etc. in a simplified manner, variation in the viscosity of guar solution containing the encapsulated agent, etc. were examined.

In examining the variation in the viscosity of the guar solution, in the first place, guar powder (available from SIGMA) of 12.56 grams was dissolved in ion-exchange water of 1300 grams that was put in a beaker by adding the guar powder of 12.56 grams by a small amount at a time while stirring the ion-exchange water with use of a three-one motor. Because the guar powder was less likely to be dissolved, in a case where a mass of the undissolved guar powder was present in the ion-exchange water, the mass of the undissolved guar powder was dissolved by crushing the mass of the guar powder using a spatula. In such a manner, the guar powder was dissolved, and therefore the guar solution was obtained. Next, a boric acid of 0.985 grams was added to the guar solution, and thereafter the guar solution was stirred (stirring length of time=four hours or longer). It is to be noted that, in a case where a mass of the undissolved guar was present in the guar solution, the mass of the undissolved guar was dissolved by crushing the mass of the guar using a spatula. Subsequently, the guar solution of 160 grams was collected in a polyethylene bottle.

Next, the guar solution was preheated (heating temperature=80 degrees centigrade, heating length of time=30 minutes), and thereafter the guar solution was left as it was (duration of being left=30 minutes). Subsequently, the viscosity (mPa·s) of the guar solution was measured using a viscosity measuring instrument (a cone-plate viscometer TVE-22H available from Toki Sangyo Co., Ltd.). In this case, a measuring range of H, a rotating speed of 2.5 rpm, and temperature of 25 degrees centigrade were employed. Afterward, the encapsulated agent, etc. of 0.05 grams was put into the guar solution, and thereafter the guar solution was stirred.

Subsequently, the viscosity (mPa·s) of the guar solution was measured by taking out part of the guar solution every 15 minutes after the guar solution was stored in a thermostatic oven (the mini-jet oven MO-921 available from TOYAMA SANGYO CO., LTD., temperature=80 degrees centigrade). In this case, the measurement of the viscosity was repeated until storage time of the guar solution reached 360 hours.

Finally, the viscosity-reducing effect of the encapsulated agent, etc. was evaluated on the basis of the measurement results of the viscosity of the guar solution, and the result represented in Table 1 was obtained. In this case, a case where the viscosity decreased by 90% or more relative to an initial value (the viscosity at the start of storage of the guar solution) within two hours after the elapse of two hours or more from the start of storage of the guar solution was determined as "good", and a case other than the above case was determined as "poor".

TABLE 1

| Experimental examples | Central part Viscosity-reducing material | Outer part Holding material | Outer part Particulate substance | Outer part Distribution | Viscosity-reducing effect |
|---|---|---|---|---|---|
| 1 | Ammonium persulfate | SB latex | Talc | Presence of local maxima | Good |
| 2 | Potassium persulfate | SB latex | Talc | Presence of local maxima | Good |
| 3 | Ammonium persulfate | — | — | — | Poor |
| 4 | Ammonium persulfate | SB latex | Talc | Absence of local maxima | Poor |

In a case where the outer part 2 was not formed (the experimental example 3), the viscosity decreased by 90% or more within half an hour from the start of storage of the guar solution. This result indicates that, because the central part 1 (the viscosity-reducing material) was not covered with the outer part 2, the viscosity-reducing material exercised the viscosity-reducing effect immediately after the start of storage of the guar solution.

In a case where the outer part 2 was formed; however, the plurality of particulate substances 3 were distributed in such a manner that the content C in the outer part 2 (the direction D) became almost constant (the experimental example 4), the viscosity did not decrease within one hour from the start of storage of the guar solution. However, the viscosity decreased by 90% or more within half an hour after the elapse of one hour. It is considered that such a result was obtained because the plurality of central parts 1 (the viscosity-reducing materials) were exposed concurrently when the plurality of encapsulated agents were separated due to collapse of the encapsulated agent having the multi-core structure. In this case, because the viscosity-reducing material exercises the viscosity-reducing effect more than necessary in a short amount of time due to the concurrent exposure of the plurality of central parts 1, it is difficult to intentionally delay a period of time during which the viscosity-reducing material exercises the viscosity-reducing effect.

In contrast, in a case where the outer part 2 was formed, and the plurality of particulate substances 3 were distributed in such a manner that the content C was allowed to have a plurality of local maxima M in the outer part 2 (the direction D) (the experimental examples 1 and 2), the viscosity did not decrease within three and a half hours from the start of storage of the guar solution. In addition, the viscosity decreased by 90% within two hours after the elapse of three and a half hours. This result shows that, because the central part 1 (the viscosity-reducing material) was covered with the outer part 2, and the distribution of the plurality of particulate substances 3 in the outer part 2 was made appropriate, it was possible to intentionally delay a period of time during which the viscosity-reducing material exercises the viscosity-reducing effect, and the viscosity of the guar solution decreased sufficiently in a short amount of time.

Based on these results, in the encapsulated agent in which the surface of the central part 1 containing the viscosity-reducing material was covered with the outer part 2 containing the plurality of particulate substances 3, and the plurality of particulate substances 3 were distributed in such a manner that the content C was allowed to have one or more local maxima M in the outer part 2 (the direction D), a superior viscosity-reducing effect was exercised.

The invention is described thus far with reference to the embodiments and the working examples; however, the invention is not limited to the aspects described in the embodiments and the working examples, and various modifications may be made.

Specifically, the application of the encapsulated agent and the variable viscosity fluid is not limited to the hydrofracturing technique (the fracturing fluid), and they may be used for any application other than the hydrofracturing application. Also in such a case, the viscosity is sufficiently reduced in a short time in the course of use of the variable viscosity fluid containing the encapsulated agent, which makes it possible to achieve a variety of effects depending on the application.

This application claims the priority on the basis of Japanese Patent Application No. 2015-152588 filed on Jul. 31, 2015 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An encapsulated agent comprising:
    a central part containing a viscosity-reducing material that reduces viscosity of a fluid to be used in a hydrofracturing technique; and
    an outer part that (1) covers a surface of the central part, (2) contains a plurality of particulate substances and a holding material, and (3) involves distribution of the plurality of particulate substances that allows a content to have one or more local maxima in a direction away from the central part, the holding material holding the plurality of particulate substances and enabling gradual release of the central part in the fluid,
    wherein the outer part includes a large-content region and a small-content region, the content of the plurality of particulate substances in the large-content region is larger than the content of the plurality of particulate substances in the small-content region, and
    the large-content region and the small-content region are disposed alternately in the direction away from the central part.

2. The encapsulated agent according to claim 1, wherein the large-content region includes the plurality of particulate substances, and
    the small-content region does not include the plurality of particulate substances.

3. The encapsulated agent according to claim 1, wherein the small-content region is disposed at a position closest to the central part.

4. The encapsulated agent according to claim 1, wherein the small-content region is disposed at a position farthest from the central part.

5. The encapsulated agent according to claim 1, wherein the fluid contains a viscosity-thickening agent, and
    the viscosity-reducing agent contains a material that decomposes the viscosity-thickening agent.

6. A variable viscosity fluid comprising:
    a fluid body; and
    one or more encapsulated agents including a central part and an outer part, the central part containing a viscosity-reducing material that reduces viscosity, the outer part (1) covering a surface of the central part, (2) containing a plurality of first particulate substances and a holding material, and (3) involving distribution of the plurality of first particulate substances that allows a content to have one or more local maxima in a direction away from the central part, the holding material holding the plurality of first particulate substances and enabling gradual release of the central part,
    wherein the outer part includes a large-content region and a small-content region, the content of the plurality of first particulate substances in the large-content region is larger than the content of the plurality of first particulate substances in the small-content region, and
    the large-content region and the small-content region are disposed alternately in the direction away from the central part.

7. The variable viscosity fluid according to claim 6, further comprising a plurality of second particulate substances that are not held by the holding material.

8. The variable viscosity fluid according to claim 6, further comprising a viscosity-thickening agent, wherein the viscosity-reducing agent contains a material that decomposes the viscosity-thickening agent.

9. The variable viscosity fluid according to claim 6, wherein the variable viscosity fluid is to be used in a hydrofracturing technique.

10. A method of manufacturing an encapsulated agent, the method comprising:
    preparing a coating solution containing a holding material; and
    forming an outer part that (1) covers a surface of a central part, (2) contains a plurality of particulate substances and the holding material, and (3) involves distribution of the plurality of particulate substances that allows a content to have one or more local maxima in a direction away from the central part, the central part containing a viscosity-reducing material that reduces viscosity of a fluid to be used in a hydrofracturing technique, the holding material holding the plurality of particulate substances and enabling gradual release of the central part in the fluid,
    by supplying the plurality of particulate substances to the surface of the central part to thereby repeatedly increase and decrease an amount of the plurality of particulate substances to be supplied to the surface of the central part, while applying the coating solution to the surface of the central part,
    wherein the outer part includes a large-content region and a small-content region, the content of the plurality of particulate substances in the large-content region is larger than the content of the plurality of particulate substances in the small-content region, and
    the large-content region and the small-content region are disposed alternately in the direction away from the central part.

11. The method according to claim 10, wherein the plurality of particulate substances are supplied intermittently.

12. A method of manufacturing an encapsulated agent, the method comprising:
    preparing a first coating solution and a second coating solution, the first coating solution containing a holding material and having a concentration of a plurality of particulate substances that is a first concentration, the second coating solution containing the holding material and having a concentration of the plurality of particulate substances that is a second concentration, the second concentration being higher than the first concentration; and
    forming an outer part that (1) covers a surface of a central part, (2) contains the plurality of particulate substances and the holding material, and (3) involves distribution of the plurality of particulate substances that allows a content to have one or more local maxima in a direction away from the central part, the central part containing a viscosity-reducing material that reduces viscosity of a fluid to be used in a hydrofracturing technique, the holding material holding the plurality of particulate substances and enabling gradual release of the central part in the fluid,
    by alternately applying, onto the surface of the central part, the first coating solution and the second coating solution one or more times,
    wherein the outer part includes a large-content region and a small-content region, the content of the plurality of particulate substances in the large-content region is larger than the content of the plurality of particulate substances in the small-content region, and
    the large-content region and the small-content region are disposed alternately in the direction away from the central part.

13. The method according to claim 12, wherein the second coating solution contains the plurality of particulate substances, and the first coating solution does not contain the plurality of particulate substances.

14. A method of manufacturing an encapsulated agent, the method comprising:

preparing a coating solution containing a holding material; and forming an outer part that (1) covers a surface of a central part, (2) contains a plurality of particulate substances and the holding material, and (3) involves distribution of the plurality of particulate substances that allows a content to have one or more local maxima in a direction away from the central part, the central part containing a viscosity-reducing material that reduces viscosity of a fluid to be used in a hydrofracturing technique, the holding material holding the plurality of particulate substances and enabling gradual release of the central part in the fluid, by alternately repeating, on the surface of the central part, a process of applying the coating solution and a process of attaching the plurality of particulate substances to the applied coating solution, wherein the outer part includes a large-content region and a small-content region, the content of the plurality of particulate substances in the large-content region is larger than the content of the plurality of particulate substances in the small-content region, and the large-content region and the small-content region are disposed alternately in the direction away from the central part.

* * * * *